(12) United States Patent
Takahashi et al.

(10) Patent No.: US 8,627,642 B2
(45) Date of Patent: Jan. 14, 2014

(54) CLIPPINGS COLLECTING-DISCHARGING DEVICE

(75) Inventors: Koji Takahashi, Tokyo (JP); Tomoji Utsugi, Kawagoe (JP); Kazuo Furukawa, Sakura (JP)

(73) Assignee: Mamiya-Op Co., Ltd., Tokyo (JP)

( * ) Notice: Subject to any disclaimer, the term of this patent is extended or adjusted under 35 U.S.C. 154(b) by 0 days.

(21) Appl. No.: 13/343,562

(22) Filed: Jan. 4, 2012

(65) Prior Publication Data

US 2013/0047570 A1    Feb. 28, 2013

(30) Foreign Application Priority Data

Aug. 31, 2011  (JP) .................................. 2011-189851

(51) Int. Cl.
*A01D 34/00* (2006.01)
*A01D 43/00* (2006.01)

(52) U.S. Cl.
USPC ........................................................... 56/203

(58) Field of Classification Search
USPC ................ 56/203, 202, 16.6, 320.2; 414/471; 15/79.1
See application file for complete search history.

(56) References Cited

U.S. PATENT DOCUMENTS

| | | | |
|---|---|---|---|
| 2,057,417 A | | 10/1936 | Clapper |
| 2,984,850 A | * | 5/1961 | Law et al. ...................... 15/79.1 |
| 3,744,653 A | * | 7/1973 | Jensen ........................... 414/471 |
| 3,757,503 A | * | 9/1973 | Soldavini ........................ 56/202 |
| 3,816,985 A | | 6/1974 | Sorenson et al. |
| 3,816,986 A | * | 6/1974 | Van Der Gaast ................ 56/202 |
| 3,893,284 A | * | 7/1975 | Thon et al. ....................... 56/202 |
| 3,949,540 A | * | 4/1976 | Christopherson et al. ...... 56/202 |
| 4,015,406 A | * | 4/1977 | Witt et al. ........................ 56/202 |
| 4,203,276 A | * | 5/1980 | Plamper ........................... 56/202 |
| 4,214,424 A | * | 7/1980 | Gobin ............................. 56/202 |
| 4,487,007 A | * | 12/1984 | Mullet et al. ................... 56/16.6 |
| 4,523,788 A | * | 6/1985 | Prasad ............................ 298/11 |
| 4,709,541 A | * | 12/1987 | Broman et al. .................. 56/202 |
| 4,726,177 A | * | 2/1988 | McGoughy .................... 56/202 |
| 4,731,983 A | * | 3/1988 | Yuki et al. ....................... 56/202 |
| 4,736,575 A | * | 4/1988 | Fedeli ............................ 56/202 |
| 4,829,754 A | | 5/1989 | Shimamura et al. |

(Continued)

FOREIGN PATENT DOCUMENTS

| | | |
|---|---|---|
| JP | 2002-253002 A | 9/2002 |
| JP | 2010-57446 | 3/2010 |
| NL | 1035029 C2 | 8/2009 |

OTHER PUBLICATIONS

Office Action mailed Jul. 23, 2013 for the related U.S. Appl. No. 13/343,505.

*Primary Examiner* — Árpád Fábián-Kovács
(74) *Attorney, Agent, or Firm* — Leason Ellis LLP

(57) ABSTRACT

A clippings collecting-discharging device includes: a bucket on a lawn mowing unit divided into a main body part including a clippings flow inlet and a movable part connected to an upper end of the main body part, and can be operated between a closed position where the main body part and the movable part abut against each other and an open position where the movable part is rotated upward and separated from the main body part; a discharge plate in the bucket positioned near the inlet in a lying posture when the bucket is closed; and a discharge mechanism where the discharge plate stands up toward an opening between the main body part and the movable part while interlocking with the operation of the bucket, which position is changed to the open position.

10 Claims, 25 Drawing Sheets

(56) References Cited

U.S. PATENT DOCUMENTS

| | | | |
|---|---|---|---|
| 4,843,805 A * | 7/1989 | Satoh | 56/202 |
| 4,972,666 A * | 11/1990 | Peruzzo | 56/206 |
| 4,984,420 A * | 1/1991 | Samejima et al. | 56/203 |
| 4,989,917 A * | 2/1991 | Schmidt, Jr. | 298/11 |
| 5,018,346 A * | 5/1991 | Ishimaru et al. | 56/202 |
| 5,193,882 A * | 3/1993 | Gamaldi | 298/11 |
| 5,533,326 A | 7/1996 | Goman et al. | |
| 5,628,169 A | 5/1997 | Stiller et al. | |
| 6,012,273 A * | 1/2000 | Ogasawara et al. | 56/16.6 |
| 6,050,072 A * | 4/2000 | Chabrier et al. | 56/202 |
| 6,449,933 B1 * | 9/2002 | Umemoto et al. | 56/13.3 |
| 6,513,312 B1 * | 2/2003 | Ishimori et al. | 56/203 |
| 6,591,596 B2 * | 7/2003 | Mauzizio et al. | 56/16.6 |
| 6,595,737 B1 * | 7/2003 | Parish | 414/519 |
| 6,688,091 B2 * | 2/2004 | Ishimori | 56/202 |
| 6,840,029 B2 * | 1/2005 | Ishimori | 56/202 |
| 6,931,827 B2 * | 8/2005 | Komorida et al. | 56/202 |
| 7,047,715 B2 * | 5/2006 | Suhara et al. | 56/16.6 |
| 7,047,718 B2 * | 5/2006 | Caroni | 56/205 |
| 7,124,563 B2 * | 10/2006 | Shibata et al. | 56/203 |
| 7,194,850 B2 * | 3/2007 | Asahara et al. | 56/202 |
| 7,219,489 B2 * | 5/2007 | Tada et al. | 56/202 |
| 7,325,389 B2 * | 2/2008 | Walker | 56/205 |
| 7,430,848 B2 * | 10/2008 | Suhara et al. | 56/202 |
| 7,565,790 B2 * | 7/2009 | Uemura et al. | 56/194 |
| 7,853,373 B2 | 12/2010 | Traster et al. | |
| 7,927,201 B2 * | 4/2011 | Stukenholtz et al. | 460/119 |
| 8,267,205 B2 | 9/2012 | Ishii et al. | |
| 2002/0017086 A1 | 2/2002 | Sallstrom et al. | |
| 2002/0174634 A1 | 11/2002 | Franet et al. | |
| 2002/0194826 A1 | 12/2002 | Schick et al. | |
| 2005/0044836 A1 | 3/2005 | Goto et al. | |
| 2009/0000839 A1 | 1/2009 | Ishii et al. | |
| 2010/0199623 A1 | 8/2010 | Akahane | |
| 2011/0179759 A1 | 7/2011 | Goman et al. | |
| 2012/0073895 A1 | 3/2012 | Nishi et al. | |

* cited by examiner

CLIPPINGS COLLECTING-DISCHARGING DEVICE

CROSS-REFERENCE TO THE RELATED APPLICATIONS

This application claims the benefit of Japanese Patent Application No. 2011-189851, filed Aug. 31, 2011, which is incorporated entirely by reference herein.

FIELD OF THE INVENTION

The present invention relates to a clippings collecting-discharging device that is mounted on a mower.

BACKGROUND OF THE INVENTION

There is known a collecting device that collects clippings in a hopper mounted at the front end portion of a mower (for example, see Patent Literature 1).

SUMMARY OF INVENTION

Technical Problem

It is necessary to detach the hopper from the mower in order to discharge the clippings accumulated in the hopper of the collecting device disclosed in Patent Literature 1. For such a reason, it is bothersome to discharge the clippings.

An object of the invention is to provide a clippings collecting-discharging device that can achieve the labor saving of an operation for discharging collected clippings.

Solution to Problem

According to an aspect of the invention, there is provided a clippings collecting-discharging device that is mounted at a front end portion of a mower to collect and discharge grass clippings. The clippings collecting-discharging device includes a bucket, a discharge plate, and a discharge mechanism. The bucket is mounted on the mower, is divided into a main body part including an inlet through which clippings flow and a movable part rotatably connected to an upper end portion of the main body part, and is operated between a closed position where the main body part and the movable part abut against each other and an open position where the movable part is rotated upward and separated from the main body part. The discharge plate is provided in the bucket and is positioned near the inlet in a lying posture when the bucket is in the closed position. The discharge mechanism operates the discharge plate so that the discharge plate stands up toward an opening between the main body part and the movable part while interlocking with the operation of the bucket of which the position is changed to the open position from the closed position.

If the bucket is opened when clippings are accumulated in the bucket which is divided into the main body part and the movable part, many clippings accumulated in the bucket are discharged from the opening. However, since it is difficult to discharge clippings close to the inlet 31, through which clippings flow into the collecting-discharging device, only by opening the bucket, clippings are apt to remain near the inlet. According to the collecting-discharging device in the invention, the discharge plate stands up toward an opening between the main body part and the movable part while interlocking with the operation of the bucket of which the position is changed to the open position from the closed position. Accordingly, it is possible to completely discharge clippings that are accumulated on the discharge plate.

According to another aspect of the invention, in the clippings collecting-discharging device according to the aspect of the invention, the discharge mechanism may be adapted so that a lower surface portion of the discharge plate is exposed from the main body part when the bucket is in the open position and the discharge plate stands up. According to this aspect, the lower surface portion of the discharge plate is exposed from the main body part. Accordingly, when clippings accumulated on the surface of the discharge plate slip down as the discharge plate stands up, it is possible to prevent the clippings, which have slipped down, from unexpectedly entering the main body part.

According to another aspect of the invention, in the clippings collecting-discharging device according to the aspect of the invention, the discharge mechanism may include a connecting device that connects the discharge plate to the main body part so as to allow the discharge plate to rotate, and a link of which one end is connected to the discharge plate and the other end is connected to the movable part. According to this aspect, since the movement of the movable part of the bucket is transmitted to the discharge plate by the link, it is possible to make the discharge plate interlock with the operation of the bucket. For this reason, it is not necessary to prepare a drive source such as an electric motor that independently drives the discharge plate and it is also not necessary to control the drive source so that the discharge plate interlocks with the operation of the bucket.

The opening and closing operations of the bucket may be manually performed, but may be automatically performed. For example, the clippings collecting-discharging device may further include a drive source, a link mechanism that transmits power of the drive source to the movable part, and a drive mechanism that operates the bucket between the closed position and the open position. According to this aspect, the power of the drive source is transmitted to the bucket by the link mechanism through the appropriate control of the drive source. Accordingly, it is possible to automatically perform the opening and closing operations of the bucket.

The link mechanism may include a first link of which a rotational center is set on the main body part and a second link of which one end is connected to the first link and the other end is connected to the movable part. The link mechanism may be adapted so that a connection position between the first and second links is deviated above a reference line, which connects the rotational center of the first link with a connection position between the movable part and the second link, when the bucket is in the open position. The clippings collecting-discharging device may further include a stopper that bumps against the first link so as to be capable of preventing the upward rotation of the first link when the bucket is in the open position. It is necessary to cancel out the moment, which allows the movable part to rotate downward by gravity, in order to keep the bucket in the open position. According to this aspect, the connection position between the first and second links is deviated above the reference line. Accordingly, when the bucket is in the open position, the moment is transmitted to the first link as the moment that allows the first link to rotate upward. The upward rotation of the first link is prevented by the stopper. Therefore, since it is possible to cancel out the moment, which is generated at the movable part when the bucket is in the open position, by the stopper, the power of the drive source is not needed to keep the bucket in the open position. As a result, since the power of the drive source may be stopped after the bucket is moved to the open position from the closed position, it is possible to reduce the energy consumption of the drive source.

According to another aspect of the invention, the clippings collecting-discharging device according to the aspect of the invention may further include a seal member that is made of a flexible material and is interposed between the main body part and the movable part when the bucket is in the closed position. According to this aspect, the adhesiveness between the main body part and the movable part is enhanced when the bucket is in the closed position. Accordingly, it is possible to prevent the leakage of clippings. Moreover, since the seal member is made of a flexible material, an effect of reducing noise and an effect of absorbing a shock at the time of the opening and closing of the bucket are obtained together with an effect of preventing the leakage of clippings.

DETAILED DESCRIPTION OF THE INVENTION

Description of Embodiments

Figure 1:
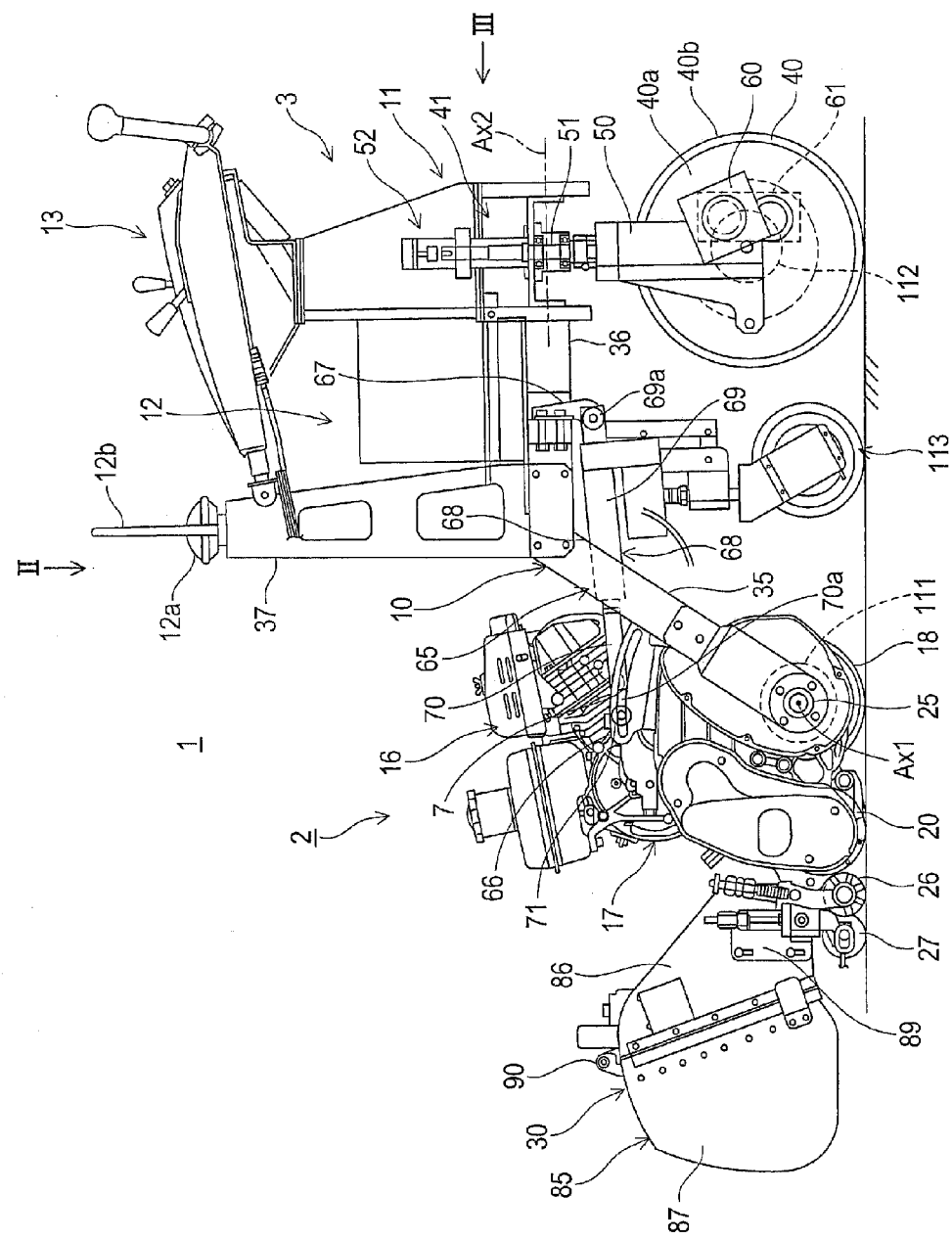
FIG. 1 is a view showing a lawn mowing vehicle according to an embodiment of the invention.
Figure 2:
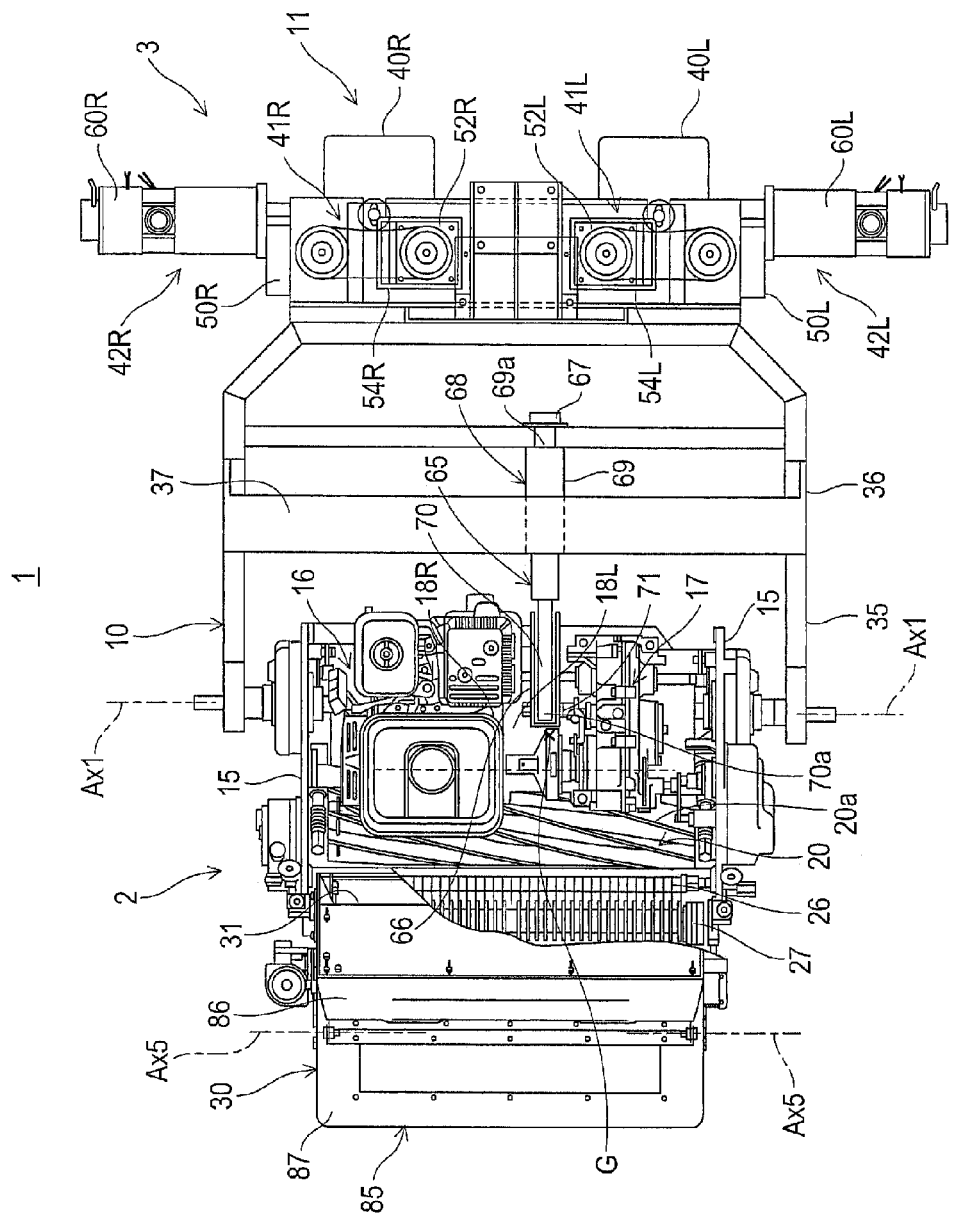
FIG. 2 is a view showing the lawn mowing vehicle of FIG. 1 as seen in the direction of an arrow II.
Figure 3:
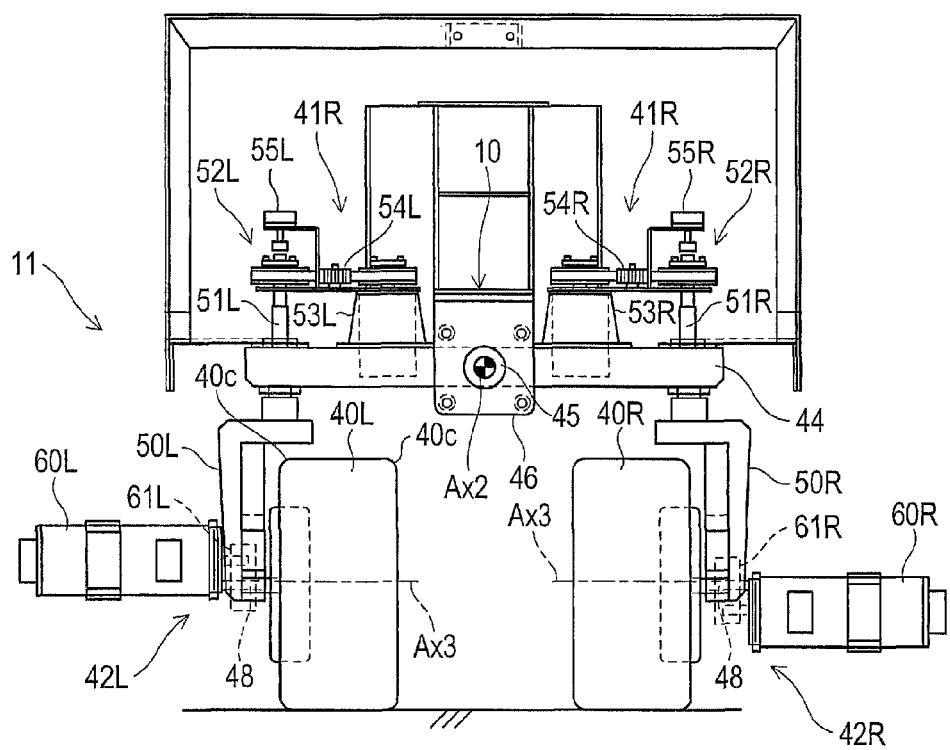
FIG. 3 is a view showing the lawn mowing vehicle of FIG. 1 as seen in the direction of an arrow III.

As shown in FIGS. 1 to 3, a lawn mowing vehicle 1 includes a lawn mowing unit 2 as a working unit and a main body 3 that can travel together with the lawn mowing unit 2. A longitudinal direction of a vehicle body of the lawn mowing vehicle 1 corresponds to a lateral direction of FIG. 1, a vertical direction of the vehicle body corresponds to a vertical direction of FIG. 1, and a vehicle width direction or a lateral direction corresponds to a vertical direction of FIG. 2. L and R may be added to reference numerals for the distinction of the left and right of the respective parts of the lawn mowing vehicle 1. The operating mode of the lawn mowing vehicle 1 may be switched among a radio control mode, a manual control mode, and an autonomous traveling mode. A user may use the lawn mowing vehicle 1 by selecting one mode from these modes according to use. The lawn mowing unit 2 is formed on the basis of a reel type mower that performs lawn mowing. The main body 3 includes a frame 10 that is connected to the lawn mowing unit 2, a steering drive device 11 that is provided in the frame 10, an electrical unit 12 that includes various electronic devices or peripheral devices, and an operating unit 13 that is used to operate the lawn mowing vehicle 1. Meanwhile, for convenience, the electrical unit 12 is not shown in each of the drawings specifically and in detail. Further, the operating unit 13 is not shown in FIGS. 2 and 3.

The lawn mowing unit 2 includes a base 15 (see FIG. 2), and various devices for performing lawn mowing is provided on the base 15. The lawn mowing unit 2 includes an engine 16 that is mounted on the base 15, and a transmission 17 that changes the output of the engine 16 and transmits the output to the respective portions. Power output from the transmission 17 is transmitted to left and right drum wheels 18L and 18R and is transmitted to a cylindrical cutting blade unit 20. The cutting blade unit 20 is formed by mounting plural spiral cutting blades 20a on a cylindrical frame.

Figure 4:
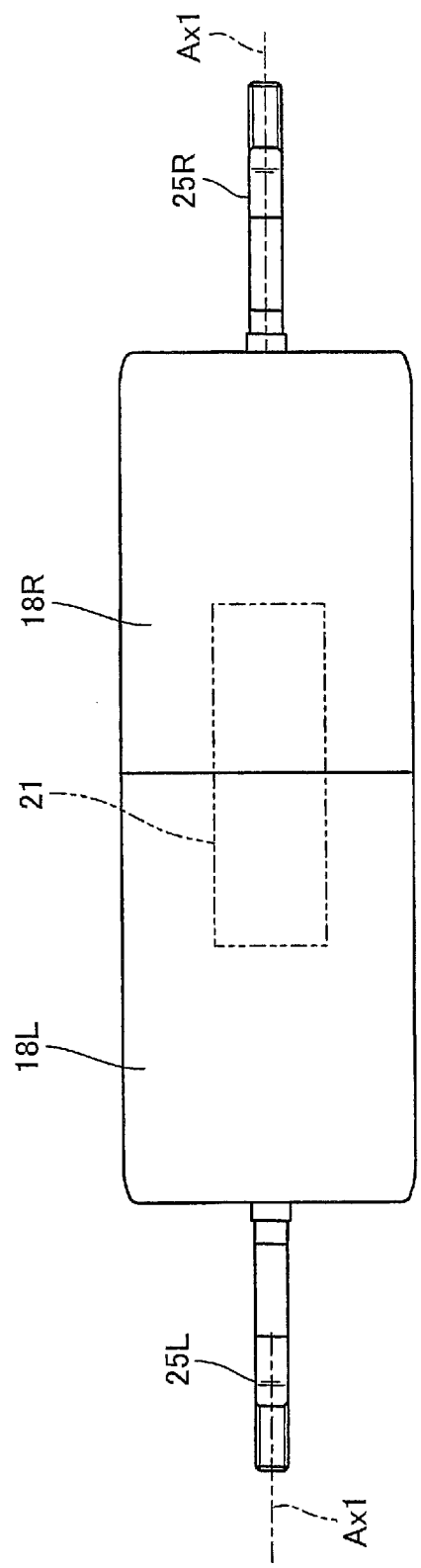
FIG. 4 is a cross-sectional view of a drum wheel.

As shown in FIG. 4, the drum wheels 18L and 18R are formed of non-steered wheels that are driven so as to rotate about an axis Ax1 extending in the vehicle width direction as a rotational center. The drum wheels 18L and 18R are formed so that the length of each of the drum wheels 18L and 18R in the vehicle width direction is larger than the diameter of each of the drum wheels 18L and 18R. Accordingly, it is possible to reduce damage to a lawn surface by reducing the contact pressure on the lawn surface. The drum wheels 18L and 18R are disposed adjacent to each other in the vehicle width direction, and are connected to each other by a connecting mechanism 21 so as to rotate relative to each other. The drum wheels 18L and 18R include axles 25L and 25R that protrude in the vehicle width direction. A differential mechanism (not shown) is provided on a power transmission path between the transmission 17 and the axles 25L and 25R. The drum wheels 18L and 18R can be differentially rotated by the differential mechanism. The pair of drum wheels 18L and 18R corresponds to a pair of rotating bodies.

A thatching roller 26 and a smoothing roller 27 are disposed in front of the drum wheels 18L and 18R. The thatching roller 26 removes clippings that are caught by the lawn. Since the smoothing roller 27 is mounted on the base 15 so as to be capable of being lifted and lowered, the length of the lawn cut by the cutting blade unit 20 can be adjusted by the smoothing roller 27. Grass clippings, which are cut by the cutting blade unit 20, are collected by a collecting-discharging device 30, which is provided at the front end portion of the lawn mowing unit 2, after being guided forward by a cover (not shown). An inlet 31 through which grass clippings flow into the collecting-discharging device is formed at the collecting-discharging device 30.

As shown in FIGS. 1 and 2, the frame 10 is rotatably mounted on the axles 25 of the drum wheels 18. Accordingly, the frame 10 is connected to the working unit 2 so as to be rotatable about the axis Ax1 and immovable in the direction of the axis Ax1. Therefore, the frame 10 is rotated relative to the lawn mowing unit 2 about the axis Ax1, so that it is possible to absorb the unevenness of the road surface in the longitudinal direction of a vehicle body. For this reason, the road surface following property of the lawn mowing vehicle 1 is improved. The frame 10 includes inclined portions 35 that extend obliquely upward from positions where the inclined portions are connected to the lawn mowing unit 2, and horizontal portions 36 that extend from the inclined portions 35 in the lateral direction. Since the frame 10 includes the inclined portions 35, a structure such as the frame 10 is not positioned immediately above the lawn mowing unit 2. For this reason, the upper portion of the lawn mowing unit 2 is easily exposed to the outside, and the frame 10 does not hinder when the maintenance of the lawn mowing unit 2 is performed or when various operations of the lawn mowing unit 2 are performed. Accordingly, the maintainability of the lawn mowing unit and the operability of various operations of the lawn mowing unit are improved. The electrical unit 12 and the operating unit 13 are disposed on the horizontal portions 36. A rack section 37 is mounted on the front ends of the horizontal portions 36. A GPS antenna 12a and a radio antenna 12b of the electrical unit 12 are respectively mounted on the upper portion of the rack section 37. Further, a headlight and an organism detecting sensor (not shown) are mounted on the upper portion of the rack section 37.

The steering drive device 11 includes a pair of steered wheels 40L and 40R that is disposed in the vehicle width direction, steering units 41L and 41R that are used to independently steer the respective steered wheels 40L and 40R, and wheel driving units 42L and 42R that drive the respective steered wheels 40L and 40R. A pair of left and right components of the steering drive device 11 has symmetrical structure. A set of the left and right steering units 41L and 41R corresponds to steering device, and a set of the left and right wheel driving units 42L and 42R corresponds to the driving device. Each of the steered wheels 40 is formed by baking synthetic rubber 40b on the outer peripheral surface of a cylindrical main body 40a. Corners of the respective steered wheels 40 are chamfered, so that shoulder portions 40c are formed at the respective steered wheels 40. The steered wheels 40L and 40R are mounted on a rocking member 44 with the steering units 41L and 41R interposed therebetween.

As shown in FIGS. 1 and 3, the rocking member 44 is a member that extends in the vehicle width direction. The rocking member 44 is connected to the frame 10 so as to be capable of rocking about an oscillation axis Ax2 that passes through the center of the rocking member and extends in the longitudinal direction of the vehicle body. Accordingly, since the rocking member 44 can absorb the unevenness or inclination of the road surface in the vehicle width direction by rocking, the road surface following property of the lawn mowing vehicle 1 is improved. Specifically, a rocking shaft 45, which passes through the center of the rocking member 44, is mounted on a bracket 46 that is fixed to the frame 10 through a bearing (not shown). Accordingly, the rocking member 44 is connected to the frame 10. The steering units 41L and 41R are mounted so as to be symmetric with respect to the middle portion of the rocking member 44.

Figure 5:
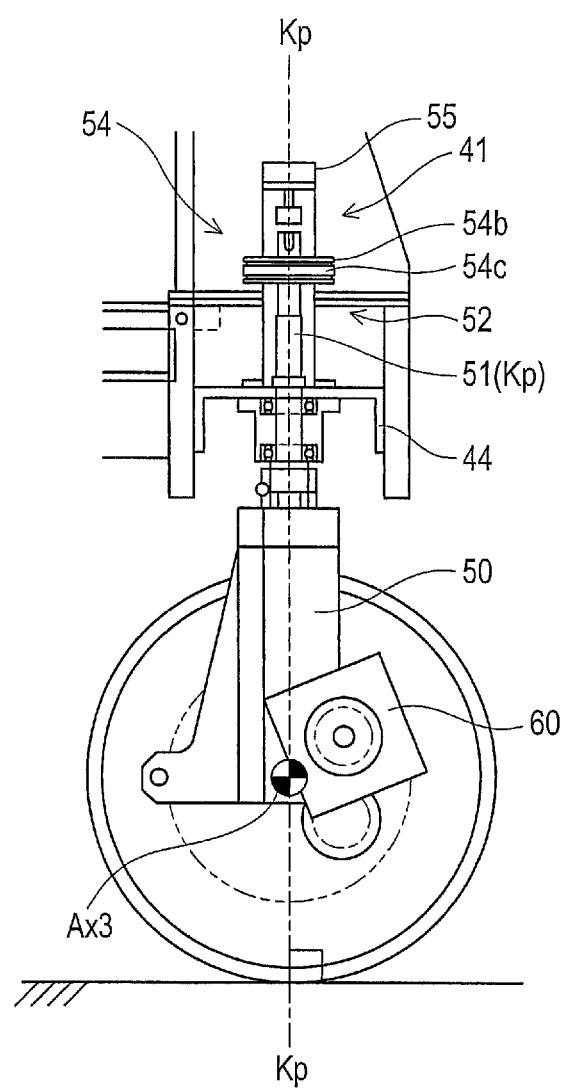
FIG. 5 is an enlarged view of a steering unit as seen in a vehicle width direction.
Figure 6:
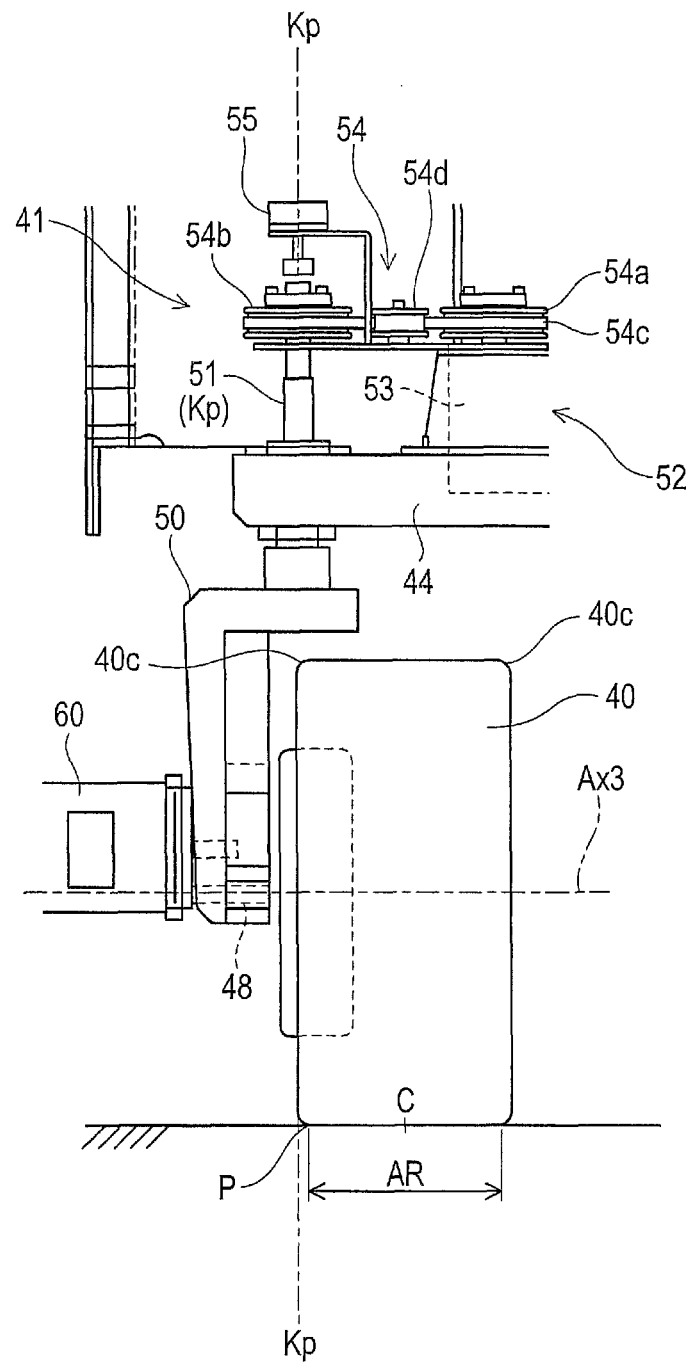
FIG. 6 is an enlarged view of the steering unit as seen from the rear side of a vehicle body.

Each of the steering units 41 includes a hub carrier 50, a turning shaft 51, and a steering mechanism 52. The hub carrier 50 supports the steered wheel 40 so that the steered wheel 40 can rotate about a rotation axis Ax3 passing through the center of an axle 48. One end of the turning shaft 51 is fixed to the hub carrier 50, and the other end of the turning shaft 51 extends upward and is rotationally provided at the rocking member 44. The steering mechanism 52 rotationally drives the turning shaft 51. The steering mechanism 52 includes an electric motor 53 that is a drive source, a transmission mechanism 54 that transfers the rotational power of the electric motor 53 to the turning shaft 51, and a rotation angle sensor 55 that detects the rotation angle of the turning shaft 51, that is, the steering angle of the steered wheel 40. As shown in FIGS. 5 and 6, the transmission mechanism 54 includes a driving pulley 54a that is connected to the electric motor 53, a driven pulley 54b that is connected to the end portion of the turning shaft 51, a belt 54c that is stretched by the driving pulley 54a and the driven pulley 54b, and a tension pulley 54d that adjusts the tension of the belt 54c. Each of the driving pulley 54a and the driven pulley 54b is a toothed pulley, and the belt 54c is a toothed belt that meshes with the respective pulleys 54a and 54b.

As shown in FIGS. 5 and 6, the turning shaft 51 of the steering unit 41 corresponds to a king pin axis Kp. Further, a caster angle is 0°, and the king pin axis Kp is orthogonal to the rotation axis Ax3. When a caster angle is 0°, it is possible to reduce the frictional resistance between the lawn surface and the steered wheel 40 during steering as compared to other cases. Accordingly, it is possible to suppress damage to the lawn surface. Further, since the king pin axis Kp is orthogonal to the rotation axis Ax3, the friction range between the lawn surface and the steered wheel 40 when the lawn mowing vehicle 1 is steered while being stopped may be made smaller than when the king pin axis Kp is set to a position separated from the rotation axis Ax3, for example, when the king pin axis Kp is set to a position separated forward or rearward from the rotation axis Ax3.

Further, as shown in FIG. 6, a king pin axis Kp of the steering unit 41 is set to a position that is separated from the middle C of the width of the steered wheel 40. In this embodiment, the king pin axis Kp is set to the end of the steered wheel 40 in the width direction of the steered wheel 40 that is close to a boundary P of a contact area AR where the steered wheel 40 comes into contact with a flat road surface. Since the king pin axis Kp is set to this position, the direction of the steered wheel 40 can be changed during the rolling of the steered wheel when the lawn mowing vehicle 1 is steered while being stopped. Accordingly, it is possible to reduce the friction between the lawn surface and the steered wheel as much as possible. In addition, since it is possible to make a distance between the steered wheel 40 and the position of the king pin axis Kp be shorter than when the king pin axis Kp is set to the position separated far from the steered wheel 40, it is possible to make the radius of rotation of the steered wheel 40 during the change of the direction of the steered wheel be small. Accordingly, it is possible to contribute to the reduction of the size of the steering drive device 11. Even when the position of the king pin axis Kp is set to the boundary P, it is possible to obtain substantially the same effect as described above.

As shown in FIG. 3, each of the wheel driving units 42 includes an electric motor 60 that is mounted on the hub carrier 50, and a reduction gear 61 that reduces the speed of the rotation of the electric motor 60 and transmits the rotation to the axle 48 of the steered wheel 40. The electric motor 60 and the reduction gear 61 are within the inner periphery of the steered wheel 40 without protruding to the outside of the steered wheel 40 in the radial direction of the steered wheel. That is, each of the wheel driving units 42 is disposed within the inner periphery of the steered wheel 40. For this reason, since the complex power transmission path between each of the wheel driving units 42 and the steered wheel 40 becomes unnecessary, it is possible to simplify the structure of the steering drive device and to contribute to the reduction of the size of the steering drive device.

Figure 7:
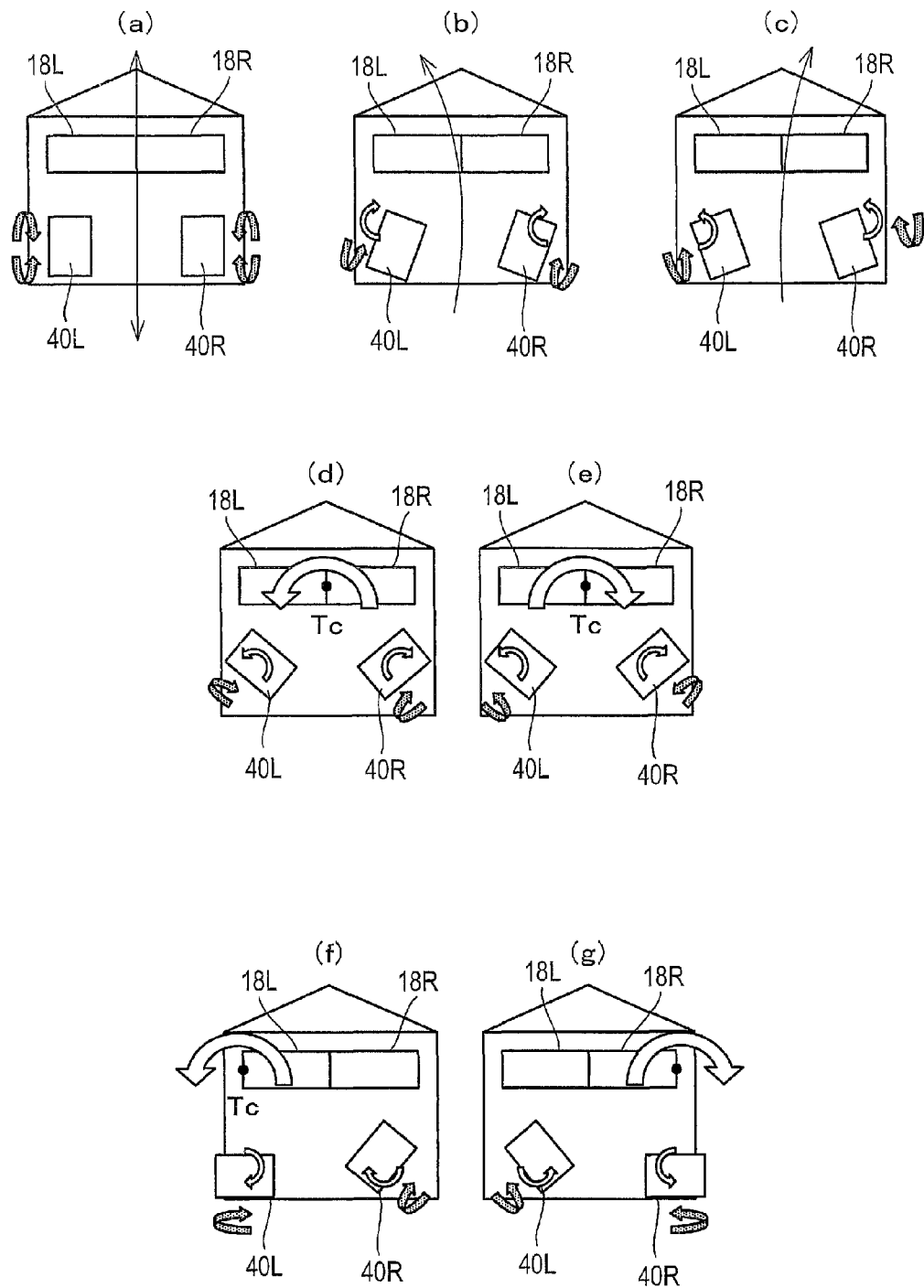
FIG. 7 is a view showing the traveling and turning patterns of the lawn mowing vehicle.

As described above, the lawn mowing vehicle 1 includes the steering drive device 11 that can independently steer and drive the pair of steered wheels 40L and 40R. Accordingly, the lawn mowing vehicle 1 can travel and turn so as to be suitable for lawn mowing. As shown in FIG. 7, it is possible to allow the working vehicle to travel in the same manner as the manner of a working vehicle in the related art by appropriately setting the steering angle and rotational driving direction of each of the steered wheels 40L and 40R. That is, the lawn mowing vehicle 1 can respectively perform (a) straight traveling, (b) left turn-traveling, and (c) right turn-traveling. Further, when the lawn mowing vehicle 1 is made to turn while being stopped, the rotation axes of the respective steered wheels 40L and 40R cross each other and the lawn mowing vehicle can turn about one arbitrary point positioned on the pair of drum wheels 18L and 18R. For example, the lawn mowing vehicle 1 can respectively perform (d) counterclockwise pivot turn about a boundary line between the pair of drum wheels 18L and 18R as a turning center Tc, (e) clockwise pivot turn about a boundary line between the pair of drum wheels 18L and 18R as a turning center Tc, (f) counterclockwise pivot turn about a left end portion of the left drum wheel 18L as a turning center Tc, and (g) clockwise pivot turn about a right end portion of the right drum wheel 18R as a turning center Tc.

Figure 8:
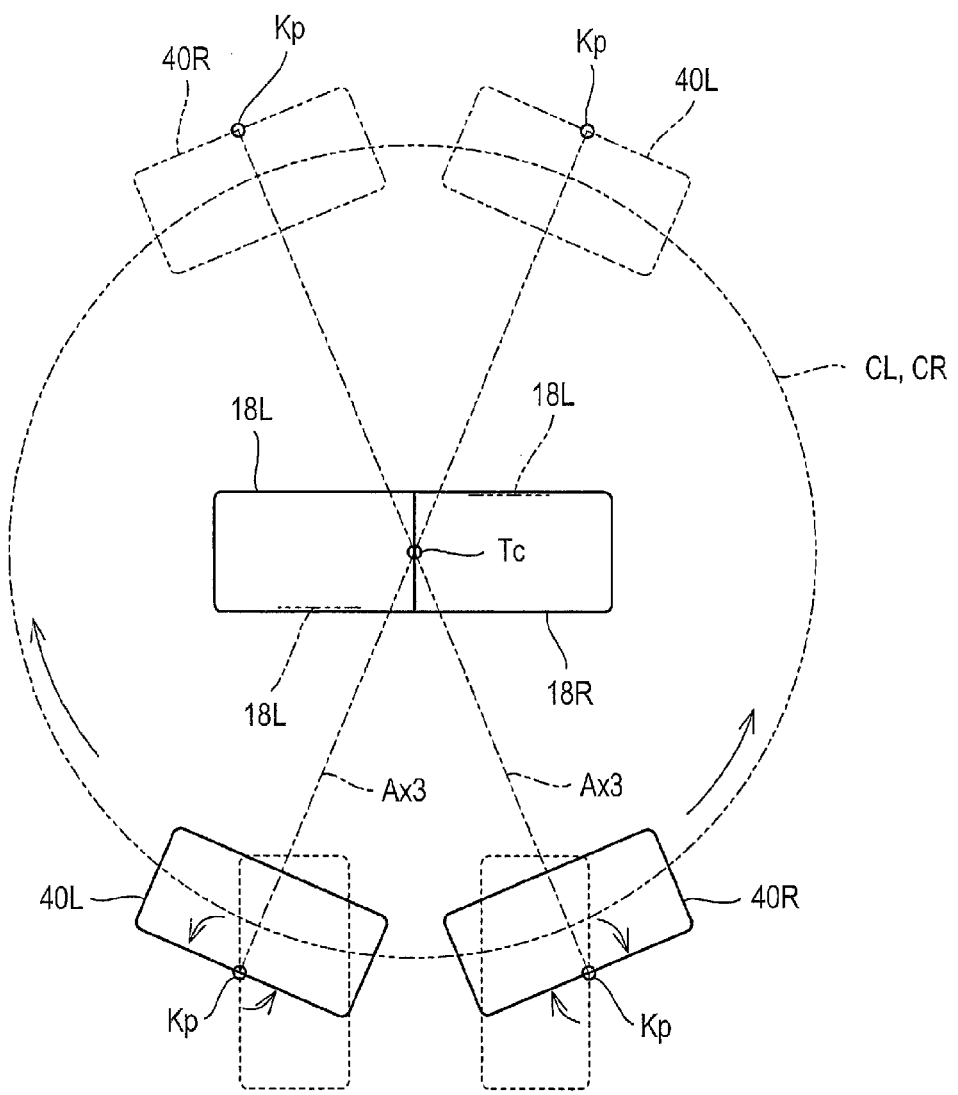
FIG. 8 is a view showing the detail of a first pivot turn.

In the case of the pivot turn of FIGS. 7D and 7E, the position of the lawn mowing vehicle is not shifted in the lateral direction and the lawn mowing vehicle 1 is reversed when the lawn mowing vehicle turns at an angle of 180°. This is referred to as a first pivot turn. As shown in FIG. 8, in the case of the first pivot turn, the lawn mowing vehicle 1 turns about the turning center Tc while the respective steered wheels 40L and 40R travel so that the traces CL and CR correspond to each other. In the case of the first pivot turn, the boundary line between the pair of drum wheels 18L and 18R serves as the turning center Tc. Accordingly, the directions of the pair of drum wheels 18L and 18R are changed before and after turning, but the position of the lawn mowing vehicle is not shifted in the lateral direction.

Figure 9:
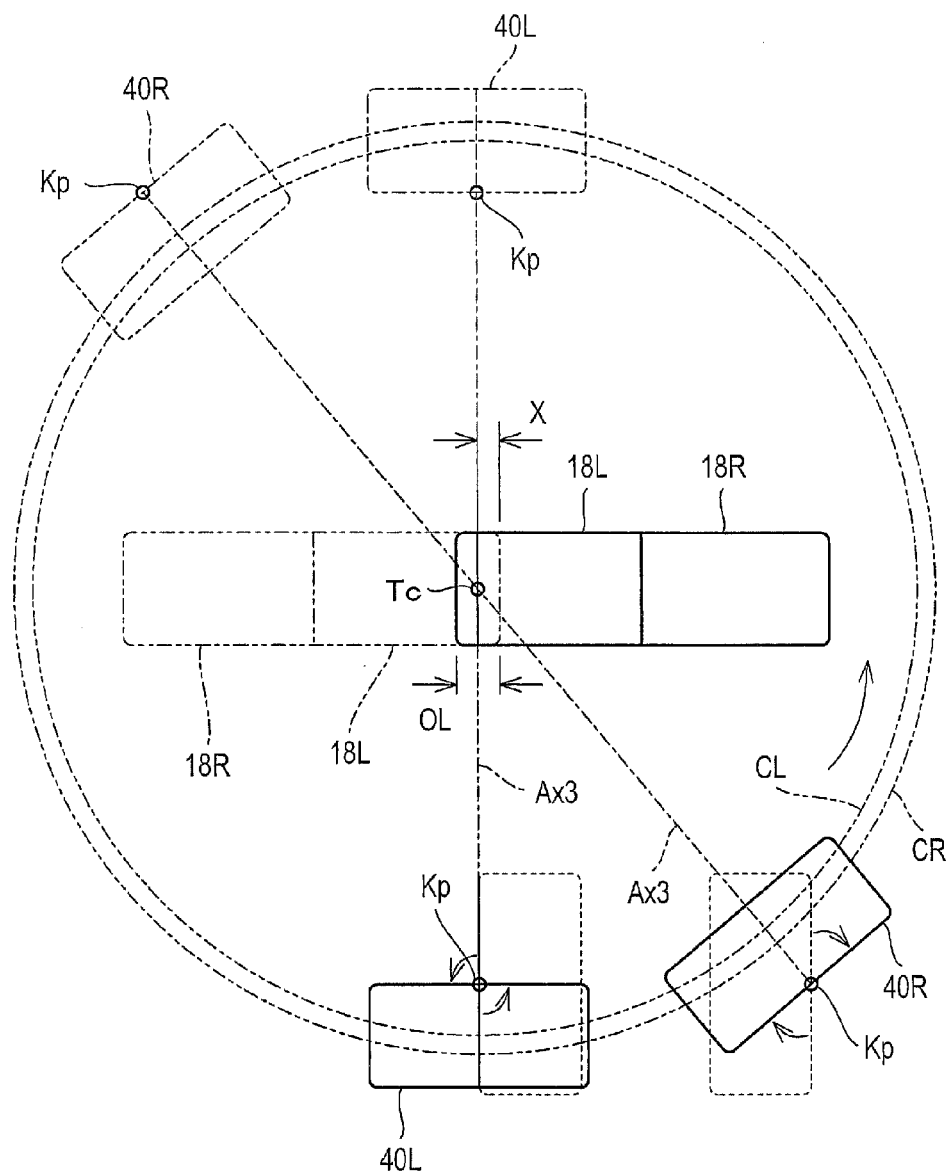
FIG. 9 is a view showing the detail of a counterclockwise first pivot turn.
Figure 10:
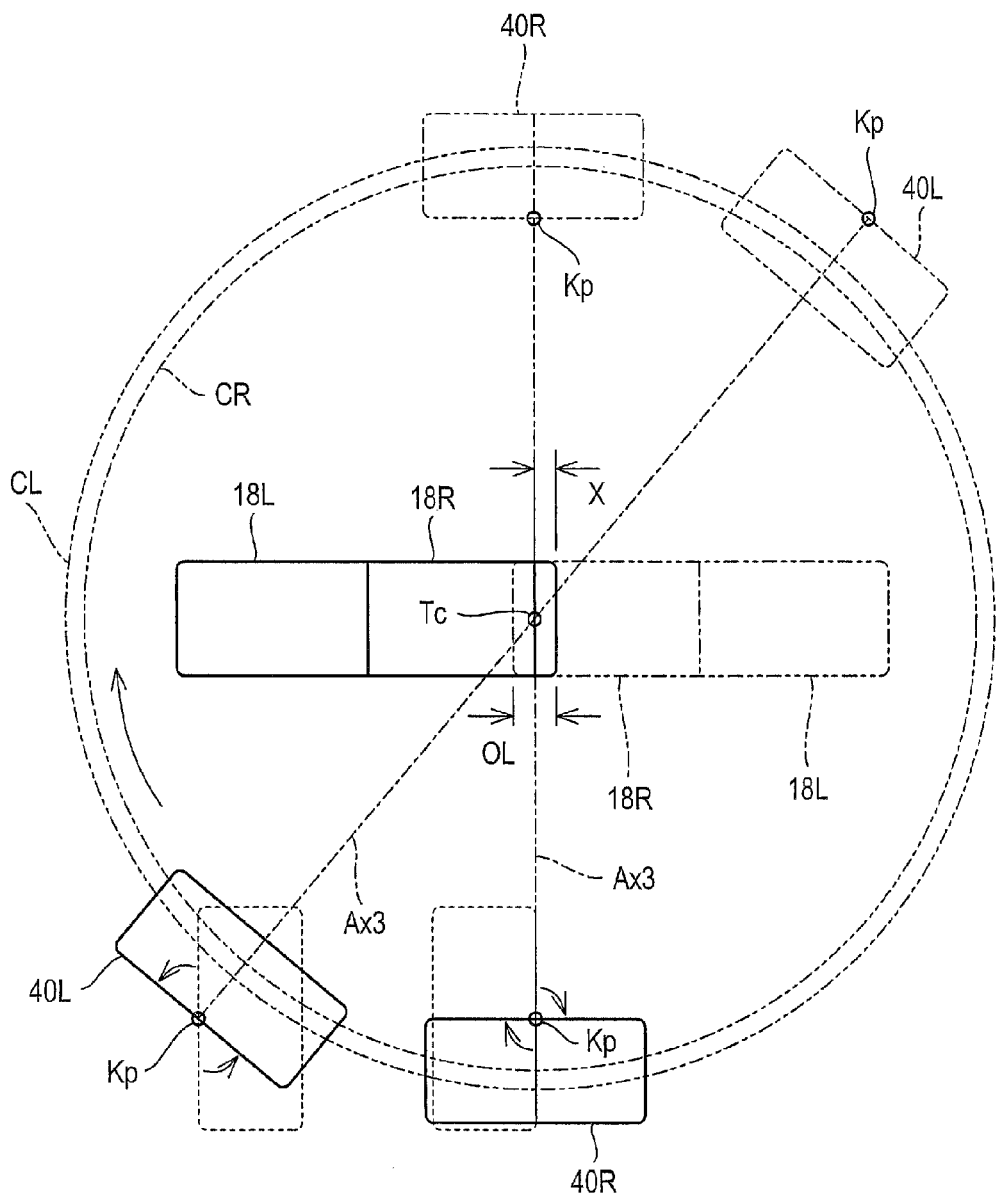
FIG. 10 is a view showing the detail of a clockwise second pivot turn.

Meanwhile, in the case of the pivot turn of FIGS. 7F and 7G, the position of the lawn mowing vehicle is shifted lateral direction and the lawn mowing vehicle 1 is reversed when the lawn mowing vehicle turns at an angle of 180°. This is referred to as a second pivot turn. As shown in FIGS. 9 and 10, in the case of the second pivot turn, the lawn mowing vehicle 1 turns about the turning center Tc while the respective steered wheels 40L and 40R travel along traces CL and CR. In the case of the second pivot turn, the pair of drum wheels 18L and 18R is shifted to the right side or left side before and after turning. When a distance between the end portion of the drum wheel 18 and the turning center Tc is denoted by an offset X as shown in FIGS. 9 and 10, an overlap OL between before and after the turning of the drum wheel 18 is the double of the offset X. Since the width of the cutting blade unit 20 (see FIG. 2) is equal to the total length of the pair of drum wheels 18L and 18R in the axial direction of the drum wheel, the overlap OL of FIG. 9 or 10 is equal to an overlap between lawn mowing ranges of the cutting blade unit 20.

For example, when lawn mowing is to be performed by the reciprocation of the lawn mowing vehicle 1 on the lawn surface having a certain area like when the lawn of the green of a golf course is to be mowed, the lawn mowing ranges of the lawn mowing vehicle generally overlap each other during the reciprocation of the lawn mowing vehicle in order to prevent the lawn from being not mowed. As described above, the offset X is set by the steering angles of the respective steered wheels 40L and 40R and the lawn mowing vehicle 1 can perform the second pivot turn. Accordingly, since the overlap between the lawn mowing ranges can be set simultaneously with the completion of the second pivot turn, an operation for setting an overlap does not need to be particularly performed after turning. Therefore, it is possible to perform efficient lawn mowing.

As shown in FIGS. 1 and 2, the lawn mowing vehicle 1 is provided with a lifting device 65 that lifts and lowers the lawn mowing unit 2. The lifting device 65 includes a first support member 66 that is provided at the lawn mowing unit 2, a second support member 67 that is provided at the frame 10, which is a part of the main body 3, and a linear actuator 68 as a drive mechanism that is provided between the first and second support members 66 and 67. The linear actuator 68 includes a main body part 69 that includes a drive source, and a retractable rod 70 that is assembled with the main body part 69. A front end portion 70a of the retractable rod 70 is linked to the first support member 66, and a rear end portion 69a of the main body part 69 is linked to the second support member 67. The front end portion 70a corresponds to a first end portion, and the rear end portion 69a corresponds to a second end portion. The linear actuator 68 can cause the retractable rod 70 to makes a stroke relative to the main body part 69 in a design range. Accordingly, the linear actuator 68 can change the distance between the front end portion 70a of the retractable rod 70 and the rear end portion 69a of the main body part 69. In this embodiment, a distance between the front end portion 70a of the retractable rod 70 and the rear end portion 69a of the main body part 69, which is based on a state where the smoothing roller 27 and the drum wheels 18 of the lawn mowing unit 2 come into contact with the road surface and the steered wheels 40 come into contact with the road surface, corresponds to a reference distance.

Figure 11A:
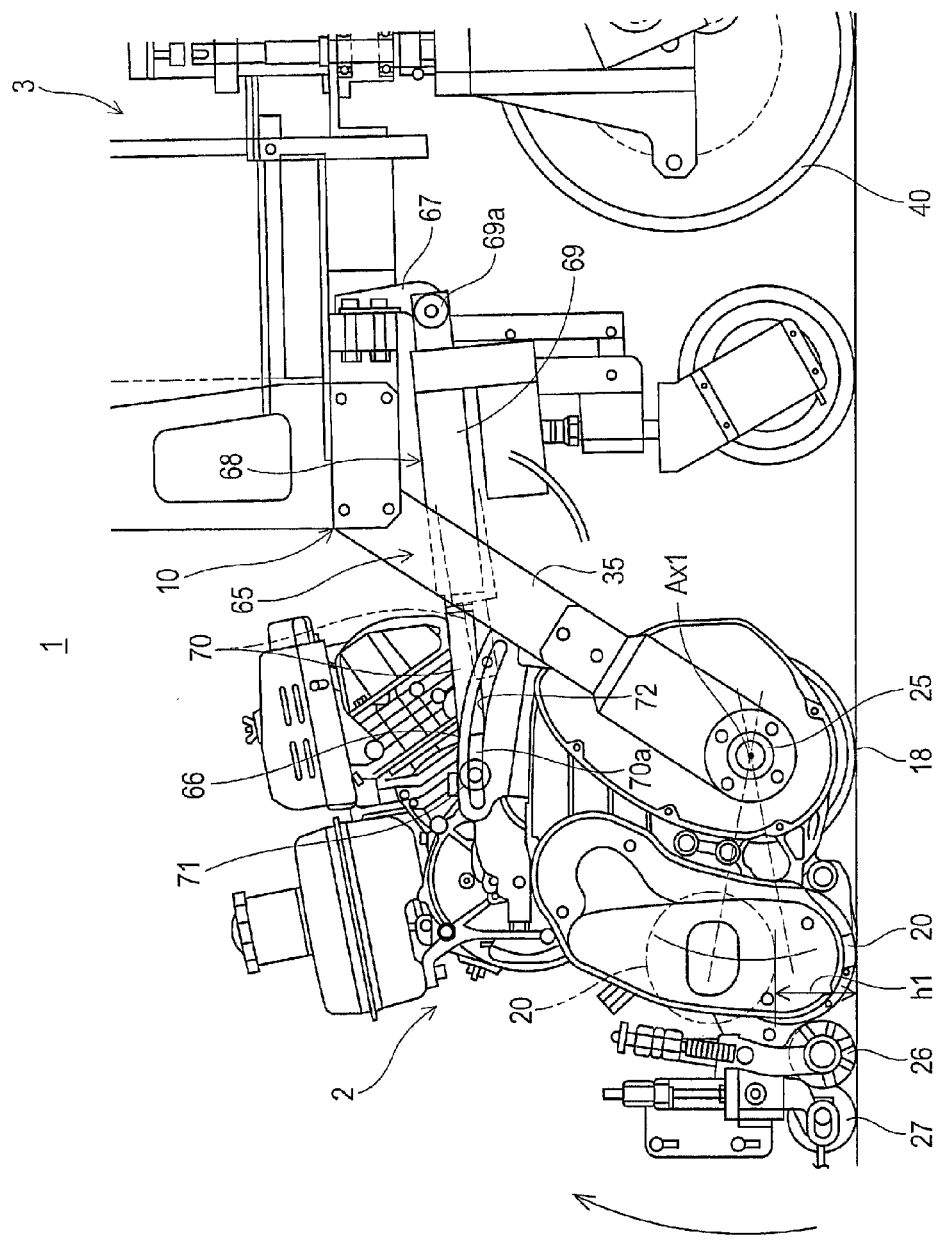
FIG. 11A is a view showing the detail of a lifting device and a state where a cutting blade unit is lifted.

As shown in FIG. 11A, a restricting tool 71, which restricts and releases the connection position of the front end portion 70a of the retractable rod 70, is mounted on the first support member 66. A long hole 72, which is curved upward, is formed at the first support member 66 in order to change the connection position of the front end portion 70a. It is possible to change the connection position of the front end portion 70a of the retractable rod 70 in the range of the long hole 72. In order to adjust this connection position, the restricting tool 71 is brought into a release state first and the connection position is changed along the long hole 72. After that, the state of the restricting tool 71 is switched to a restricted state from the release state at the changed connection position. Accordingly, it is possible to adjust the connection position to a desired position. The combination of the restricting tool 71 and the long hole 72 corresponds to a position adjusting mechanism.

As shown in FIG. 11A, when the retractable rod 70 of the linear actuator 68 retracts to a position shown by a two-dot chain line from a state where the drum wheels 18 and the steered wheels 40 come into contact with the road surface, the lawn mowing unit 2 is lifted while being rotated upward about the axis Ax1 in a state where the drum wheels 18 come into contact with the road surface. Accordingly, since the cutting blade unit 20 floats from the road surface, it is possible to stop lawn mowing. Further, when the retractable rod 70 returns to the original length shown by a solid line from a state where the cutting blade unit 20 floats from the road surface, the cutting blade unit 20 comes into contact with the road surface. Accordingly, it is possible to resume lawn mowing. Furthermore, when the cutting blade unit 20 floats from the lawn surface by the lifting device 65, the cutting blade unit 20 is not dragged while coming into contact with the lawn surface even though the lawn mowing vehicle 1 performs a pivot turn. Therefore, it is possible to prevent the lawn surface from being significantly damaged during the pivot turn of the lawn mowing vehicle 1. Meanwhile, a lift distance h1 of the cutting blade unit 20 can be changed by the adjustment of the connection position of the front end portion 70a or the stroke of the retractable rod 70.

Figure 11B:
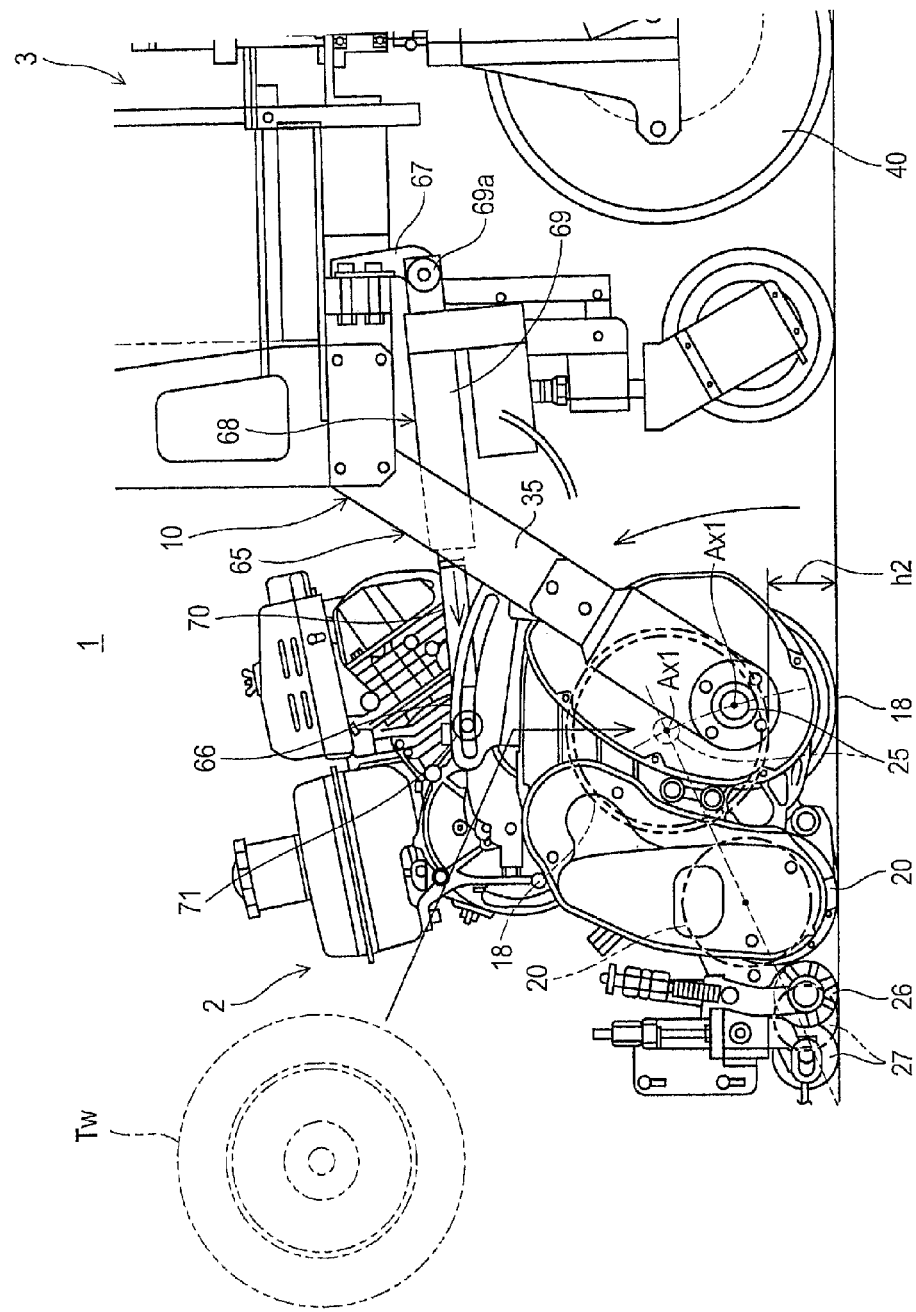
FIG. 11B is a view showing the detail of the lifting device and a state where the drum wheels are lifted.

Meanwhile, as shown in FIG. 11B, when the retractable rod 70 of the linear actuator 68 extends in the direction of an arrow from a state where the drum wheels 18 and the steered wheels 40 come into contact with the road surface and the lawn mowing vehicle 1 is stopped, the lawn mowing unit 2 is rotated about the smoothing roller 27 as a fulcrum in the direction opposite to the direction of FIG. 11A. Accordingly, it is possible to make the drum wheels 18 float from the road surface while the smoothing roller 27 and the steered wheels 40 come into contact with the road surface. Since the smoothing roller 27 serves as the fulcrum of the rotation operation of the lawn mowing unit 2, it is possible to prevent the occurrence of a trouble that the lawn mowing unit 2 is bitten into the lawn surface at the time of the floating operation of the drum wheels 18. A lift distance h2 of the drum wheels 18 can be changed by the adjustment of the connection position of the front end portion 70a or the stroke of the retractable rod 70. Meanwhile, if the stroke of the linear actuator 68 is insufficient when a floating operation of the drum wheels 18 shown in FIG. 11B is performed, it is possible to compensate the lack of the stroke by adjusting the connection position of the front end portion 70a of the retractable rod 70 to the rear side of the vehicle body.

The lawn mowing vehicle 1 is adapted so that moving wheels Tw having a diameter larger than the diameter of the drum wheel 18 are detachably mounted on the axles 25. Since the lifting device 65 can make the drum wheel 18 float, it is not necessary to jack up the lawn mowing unit 2 by a device such as a hydraulic jack when the moving wheels Tw are mounted or detached. Accordingly, the practicality of the lawn mowing vehicle 1 is improved. Further, it is possible to change the respective lift distances h1 and h2 relative to the stroke of the linear actuator 68 by adjusting the connection position of the front end portion 70a of the retractable rod 70. Furthermore, it is possible to adjust a load at the time of the operation of the linear actuator 68 by adjusting the connection position of the front end portion 70a of the retractable rod 70.

Figure 12:
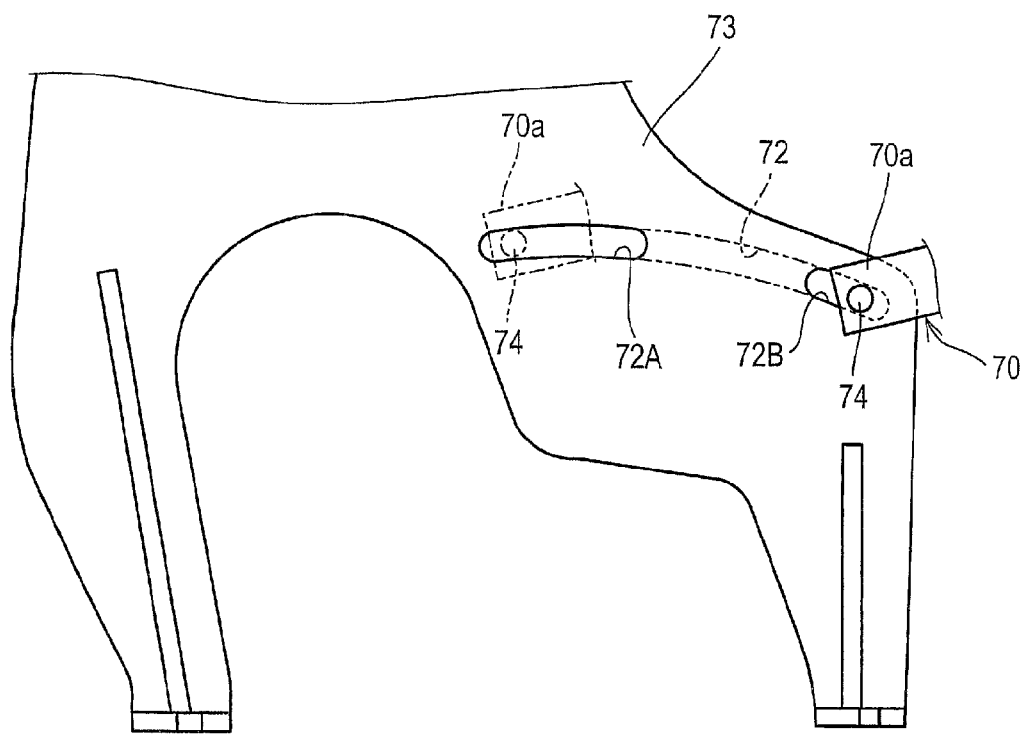
FIG. 12 is a view showing an embodiment that uses a position switching member and a position adjusting pin.

The connection position of the front end portion 70a of the retractable rod 70 may be selectively switched between a position suitable for the aspect of FIG. 11A and a position suitable for the aspect of FIG. 11B. This switching can be achieved by the linkage of a plate-like position switching member 73 and a position adjusting pin 74 shown in FIG. 12. The position switching member 73, is mounted on the lawn mowing unit 2 so as to be positioned on the opposite side of the first support member 66 with the retractable rod 70 interposed between the position switching member 73 and the first support member 66. Two long holes 72A and 72B, which overlap the long hole 72 formed at the first support member 66, are formed at the position switching member 73. The long hole 72A is disposed on the front side of the vehicle body and at a position suitable at the time of the lifting and lowering of the cutting blade unit 20 shown in FIG. 11A. The long hole 72B is disposed on the rear side of the vehicle body and at a position suitable at the time of the floating operation of the drum wheels 18 shown in FIG. 11B. The position adjusting pin 74 can be pulled out from or inserted into the long holes 72A and 72B while passing through the front end portion 70a of the retractable rod 70. Accordingly, when the cutting blade unit 20 is to be lifted and lowered (see FIG. 11A), the position adjusting pin 74 is inserted into the long hole 72A. Therefore, the front end portion 70a of the retractable rod 70 is positioned in the range of the long hole 72A and the position adjusting pin 74 serves as a point of application, so that the cutting blade unit 20 can be lifted and lowered. Meanwhile, when the drum wheels 18 are made to float (see FIG. 11B), the position adjusting pin 74 is pulled out from the long hole 72A and inserted into the long hole 72B. Accordingly, the front end portion 70a of the retractable rod 70 is positioned in the range of the long hole 723 and the position adjusting pin 74 serves as a point of application, so that the drum wheels 18 can float. In this embodiment, the combination of the position adjusting pin 74 and the respective long holes 72A and 72B of the position switching member 73 corresponds to a position adjusting mechanism. Meanwhile, while the position adjusting pin 74 is inserted into the long hole 72A or 72B, it is possible to finely adjust the connection position of the front end portion 70a by the restricting tool 71. Further, it is possible to remove an allowance between the position adjusting pin 74 and the long hole 72A or 72B.

As shown in FIG. 2, the center of gravity G of the lawn mowing unit 2 is positioned on the left side of the middle of the lawn mowing unit. That is, the weight distribution of the lawn mowing unit 2 is biased to the left side of the middle of the lawn mowing unit in the direction of the axis Ax1. The respective first and second support members 66 and 67 of the lifting device 65 are positioned on the left side to which the weight distribution is biased, and are in line in the longitudinal direction of the vehicle body. For this reason, while the lawn mowing unit 2 is lifted and lowered by the lifting device 65, the balance of the lawn mowing vehicle in the vehicle width direction is not easily lost. Accordingly, the lifting and lowering operations of the lawn mowing unit 2 are stable. Meanwhile, the respective support members 66 and 67 may be disposed on a straight line that crosses the center of gravity line and extends in the longitudinal direction of the vehicle body. In this case, while the cutting blade unit is lifted and lowered, the working unit 2 is completely balanced in the vehicle width direction. Accordingly, the stability of the lifting and lowering operations of working unit 2 is further improved.

Figure 13:
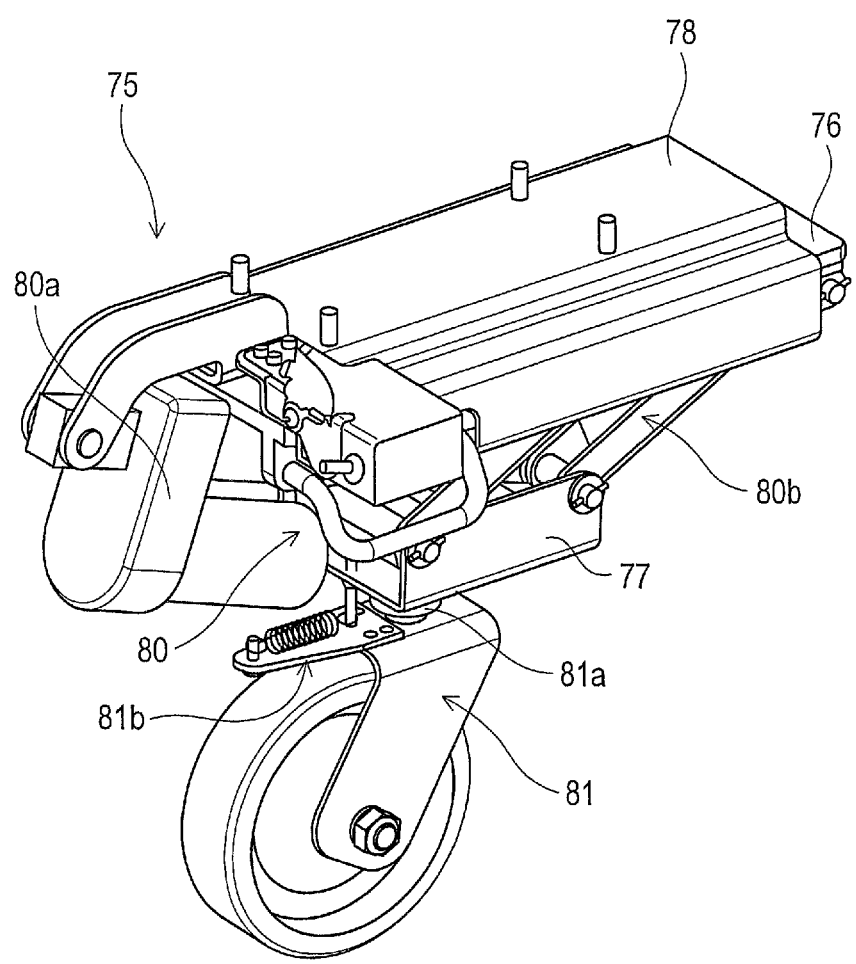
FIG. 13 is a perspective view of a jack device that is in an initial state.
Figure 14:
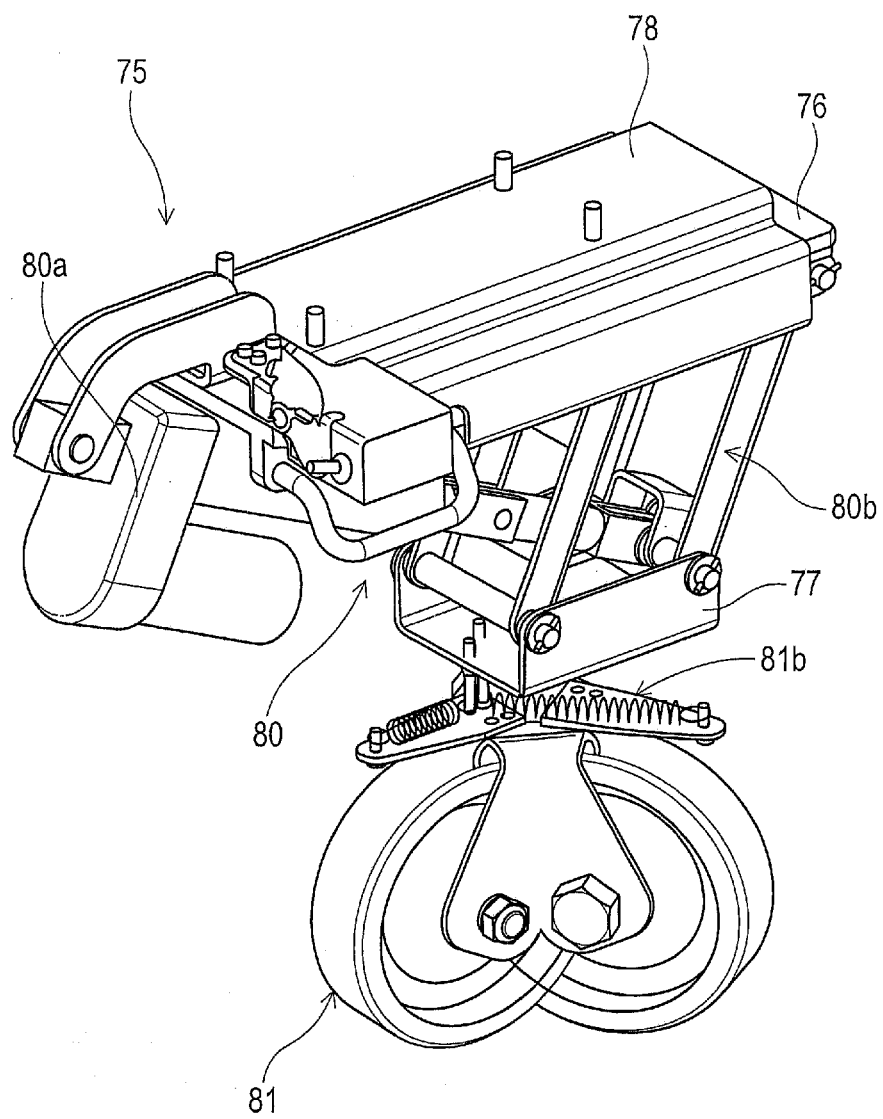
FIG. 14 is a perspective view of the jack device that is in a lifted state.
Figure 15:
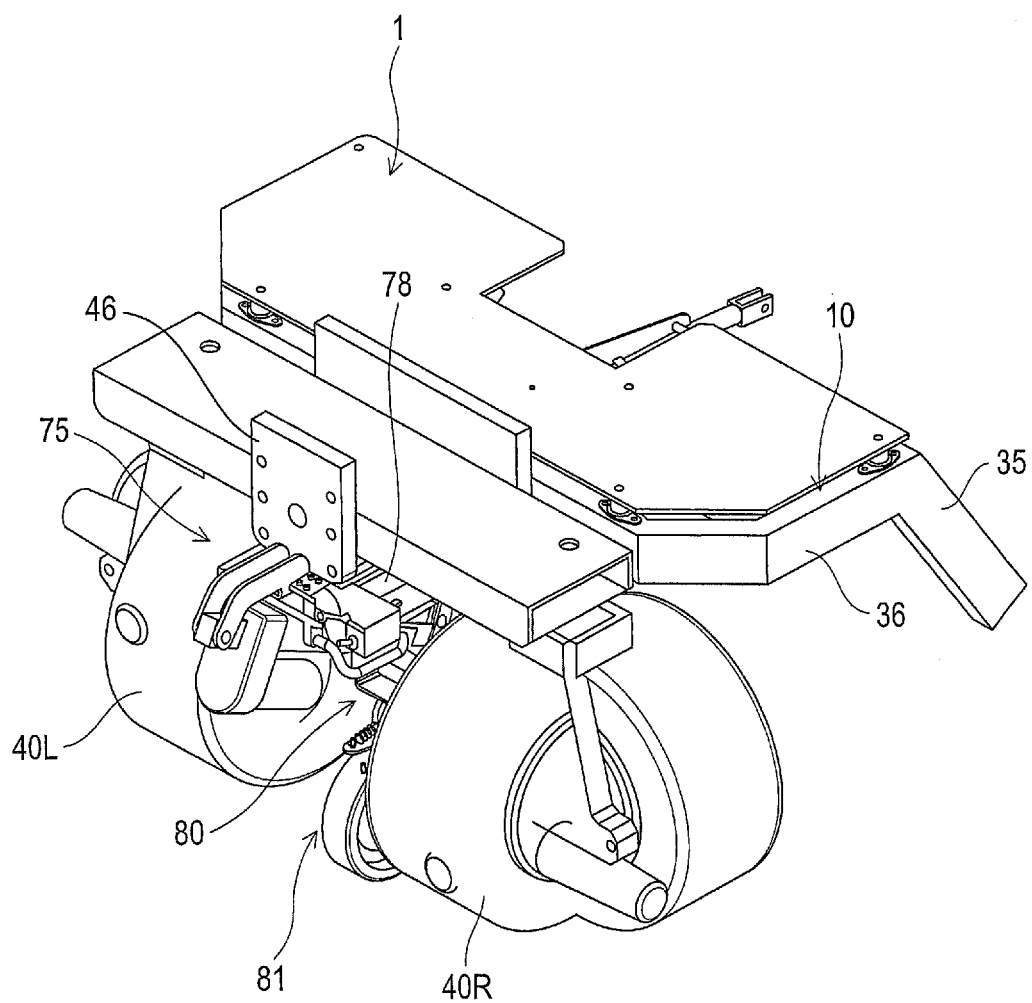
FIG. 15 is a perspective view showing a state where the jack device is mounted on the lawn mowing vehicle.

A jack device 75, which is used to make the steered wheels 40 float from the road surface, may be detachably mounted on the lawn mowing vehicle 1 as shown in FIGS. 13 to 15. The jack device 75 includes a slide base 76 and a lower base 77 that is disposed parallel to the slide base 76. The slide base 76 is mounted on a holder device 78 of the lawn mowing vehicle 1 while sliding on the holder device 78, so that the jack device 75 is mounted on the lawn mowing vehicle 1 (see FIG. 15). The holder device 78 is disposed between the left and right steered wheels 40L and 40R, and is fixed to each of the horizontal portion 36 of the frame 10 so that a sliding direction corresponds to the longitudinal direction of the vehicle body. When the jack device 75 is mounted, the holder device 78 may mesh with the slide base 76 so as to be capable of restricting the movement of the slide base in the vehicle width direction and the vertical direction.

The jack device 75 further includes a jack mechanism unit 80 and a caster unit 81. The jack mechanism unit 80 can change a gap between the slide base 76 and the lower base 77 to a state of FIG. 14 from a state of FIG. 13 while maintaining the slide base 76 and the lower base 77 parallel to each other. The caster unit 81 is provided on the lower base 77. The jack mechanism unit 80 is a well-known mechanism that moves up and down a link mechanism 80b interposed between the slide base 76 and the lower base 77 by using the power of a driving motor 80a. The caster unit 81 includes a turning shaft 81a and a return mechanism 81b. The turning shaft 81a extends in the vertical direction and is rotatably mounted on the lower base 77. The return mechanism 81b makes the caster unit return to a reference position, which corresponds to a straight-traveling state, from a state, where the direction of the caster unit has been changed as shown in FIG. 14, by using a spring force.

After the jack device 75, which is in an initial state shown in FIG. 13, is mounted on the lawn mowing vehicle 1, the state of the jack device is changed to a lifted state shown in FIG. 14 through the operation of the jack mechanism unit 80. Accordingly, it is possible to make the respective steered wheels 40L and 40R float from the road surface as shown in FIG. 15. When the respective steered wheels 40L and 40R are jacked up by the jack device 75 while the above-mentioned moving wheels Tw (see FIG. 11B) are mounted, the lawn mowing vehicle 1 is supported by the left and right moving wheels Tw and the caster unit 81. Accordingly, it is possible to naturally move the lawn mowing vehicle 1 by human power or the drive power of the engine 16 that is output to the moving wheels Tw.

Figure 16:
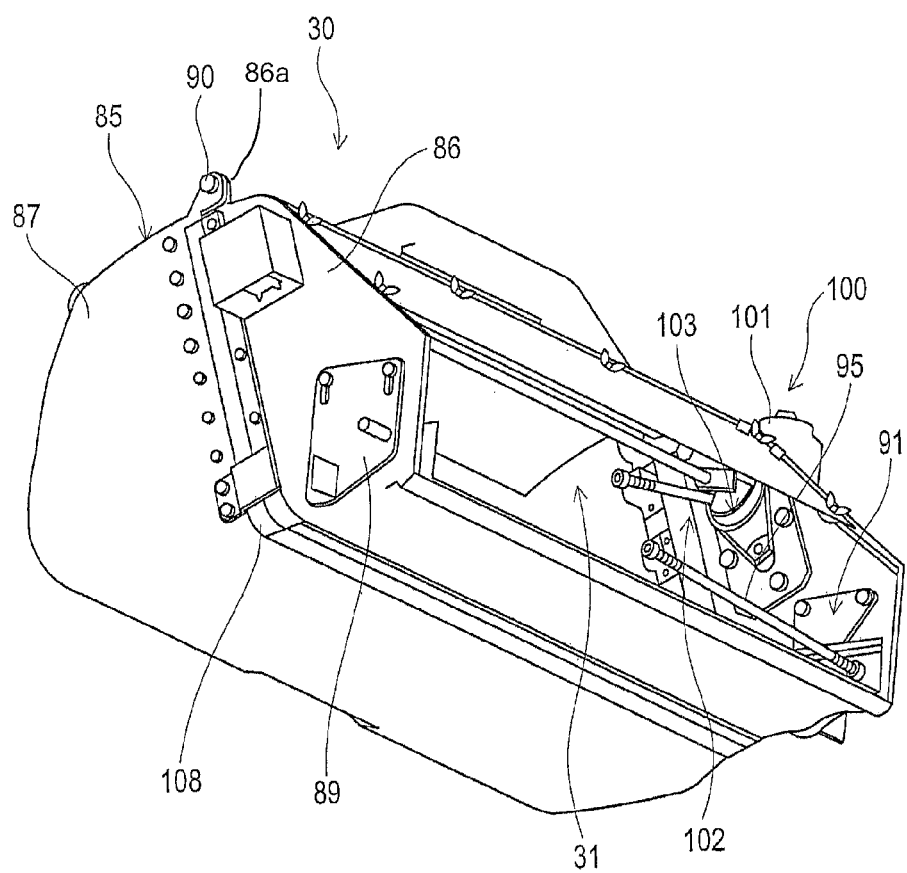
FIG. 16 is a perspective view of a collecting device where a bucket is in a closed position, as seen obliquely from the lower side.
Figure 18:
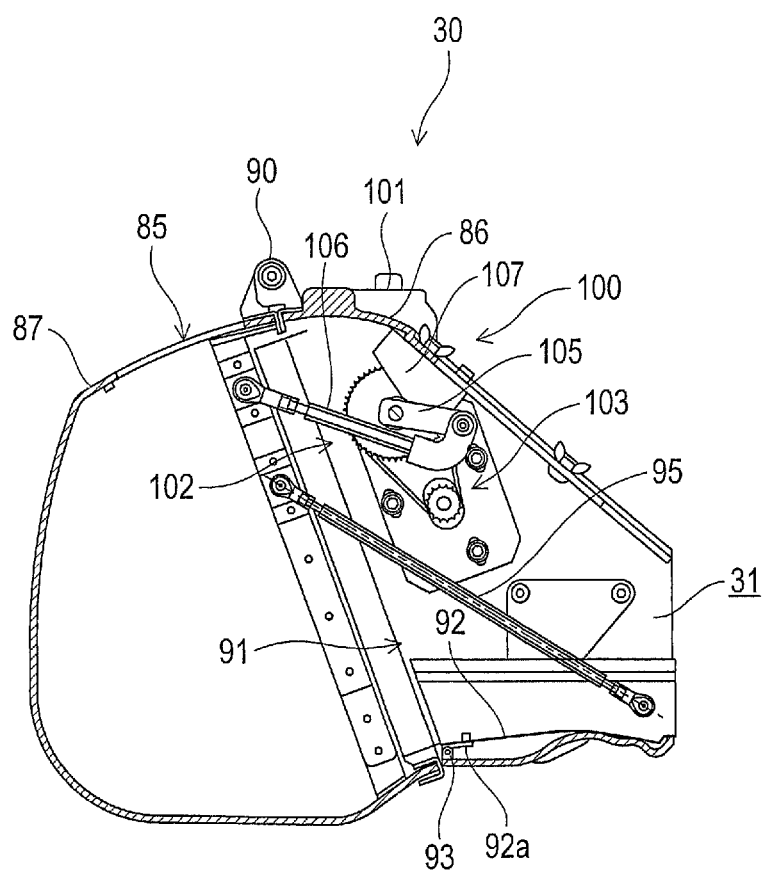
FIG. 18 is a cross-sectional view taken along a line XVIII-XVIII of FIG. 17.

Next, the collecting-discharging device 30, which is mounted on the front end portion of the lawn mowing vehicle 1, will be described. As shown in FIG. 16, the collecting-discharging device 30 includes a bucket 85 that accumulates grass clippings. The bucket 85 is divided into a main body part 86 and a movable part 87. The main body part 86 is fixed to the lawn mowing unit 2 by brackets 89. The movable part 87 is rotatably connected to an upper end portion 86a of the main body part 86. Specifically, the movable part 87 is rotatably connected to the upper end portion 86a of the main body part 86 by a hinge 90 that has a rotation axis Ax5 extending in the vehicle width direction. Accordingly, the bucket 85 may be operated between a closed position of FIG. 18 where the main body part 86 and the movable part 87 abut against each other and an open position of FIG. 19 where the movable part 87 is rotated upward and separated from the main body part 86.

If the bucket 85 is opened when clippings are accumulated in the bucket 85, many clippings accumulated in the bucket 85 are discharged. However, since it is difficult to discharge clippings close to the inlet 31, through which clippings flow into the collecting-discharging device, only by opening the bucket 85, clippings are apt to remain near the inlet 31. Accordingly, the collecting-discharging device 30 includes a discharge mechanism 91 that completely discharges the clippings accumulated in the bucket 85. The discharge mechanism 91 includes a discharge plate 92 that is provided in the bucket 85. The discharge plate 92 is positioned near the inlet 31 in a lying posture when the bucket 85 is in the closed position. A back end portion 92a of the discharge plate 92 is rotatably connected to the main body part 86 by a hinge 93 as the connecting device that has a rotation axis Ax6 extending in the vehicle width direction. The discharge mechanism 91 further includes a link 95 of which one end is connected to a position in the rear of the hinge 93 and the other end is connected to the movable part 87. Since the movement of the movable part 87 of the bucket 85 is transmitted to the discharge plate 92 by the link 95, the discharge plate 92 interlocks with the operation of the movable part 87 of the bucket 85. The length of the link 95 is adjusted so that the discharge plate 95 is in a substantially vertically standing posture when the bucket 85 is in the open position.

Figure 19:
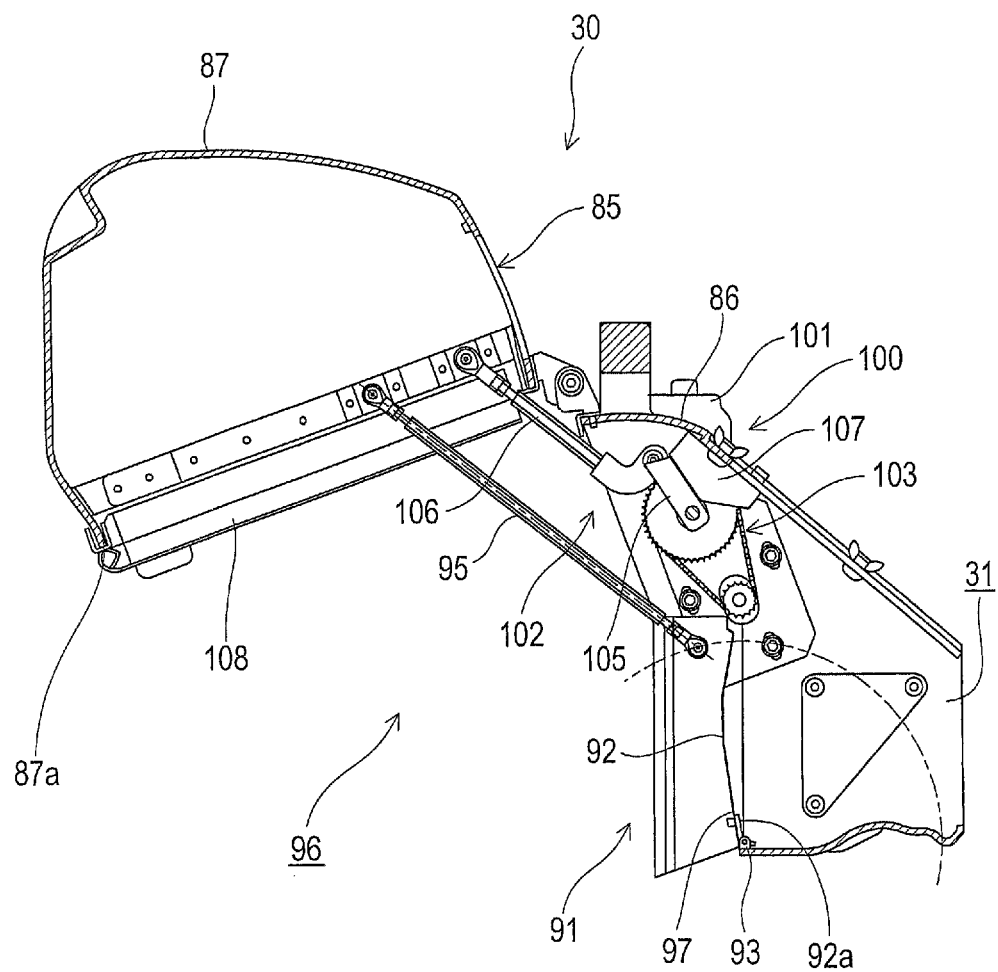
FIG. 19 is a cross-sectional view of the collecting device where the bucket is in an open position, taken along the same line as FIG. 18.

Accordingly, the discharge mechanism 91 can operate the discharge plate 92 so that the discharge plate 92 stands up toward an opening 96 (see FIG. 19) between the main body part 86 and the movable part 87 while interlocking with the operation of the bucket of which the position is changed to the open position from the closed position. Clippings close to the inlet 31 are accumulated on the surface of the discharge plate 92 that is in the lying posture. According to the discharge mechanism 91, the discharge plate 92 stands up toward the opening 96 while interlocking with the opening operation of the bucket 85. Accordingly, clippings accumulated on the discharge plate 92 are completely discharged by the discharge mechanism 91. Since the discharge plate 92 interlocks with the operation of the bucket 85 by the link 95, it is not necessary to prepare a drive source such as an electric motor that independently drives the discharge plate 92 and it is also not necessary to control the drive source so that the bucket 85 and the discharge plate 92 interlock with each other. The discharge mechanism 91 is adapted so that a lower surface portion 97 of the discharge plate 92 is exposed from the main body part 86 when the discharge plate 92 stands up as shown in FIG. 19. Since the lower surface portion 97 of the discharge plate 92 is exposed from the main body part 86, it is possible to prevent clippings from unexpectedly entering the main body part 85 when clippings accumulated on the surface of the discharge plate slip down as the discharge plate 92 stands up.

The collecting-discharging device 30 further includes a drive mechanism 100 that operates the bucket 85 between the closed position and the open position. The drive mechanism 100 includes an electric motor 101 as a drive source, and a link mechanism 102 that transmits the power of the electric motor 101 to the movable part 87. It is possible to automatically perform the opening and closing operations of the bucket 85 by appropriately controlling the electric motor 101. The power transmission between the electric motor 101 and the link mechanism 102 is performed by a chain transmission mechanism 103 that is adapted to amplify the torque of the electric motor 101 and transmit the amplified torque to the link mechanism 102. The link mechanism 102 includes a first link 105 of which a rotational center C is set on the main body part 86, and a second link 106 of which one end is connected to the first link 105 and the other end is connected to the movable part 87.

Figure 20:
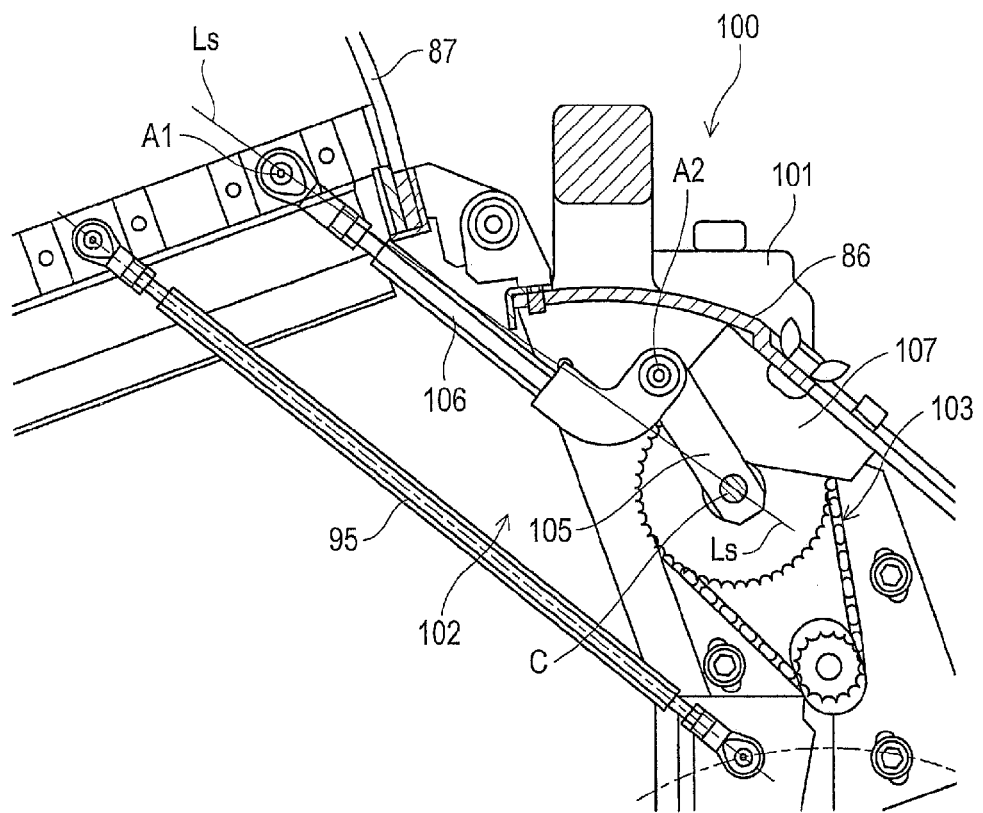
FIG. 20 is an enlarged view showing the detail of a drive mechanism of the collecting device.
Figure 21:
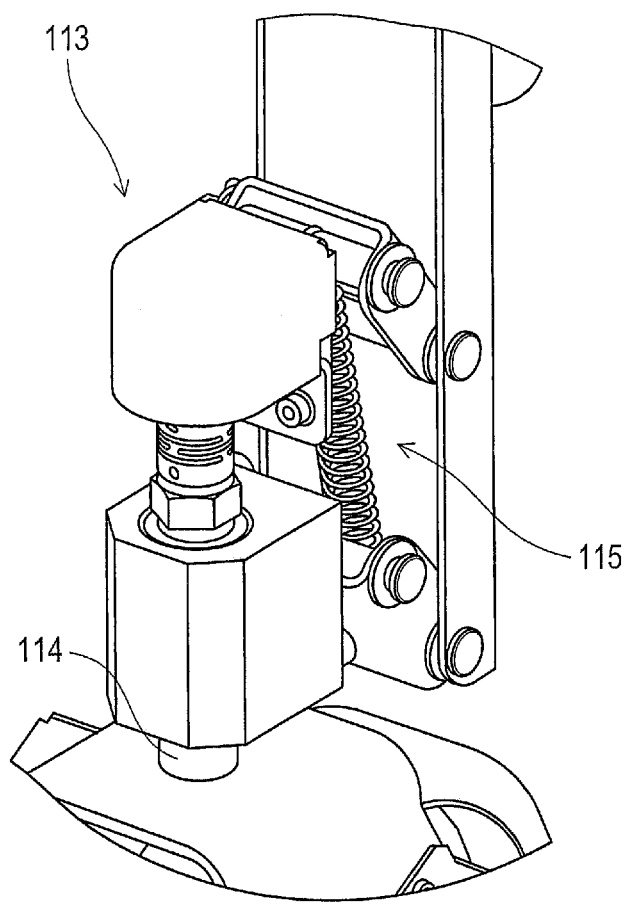
FIG. 21 is a perspective view showing a part of a free encoder.
Figure 22:
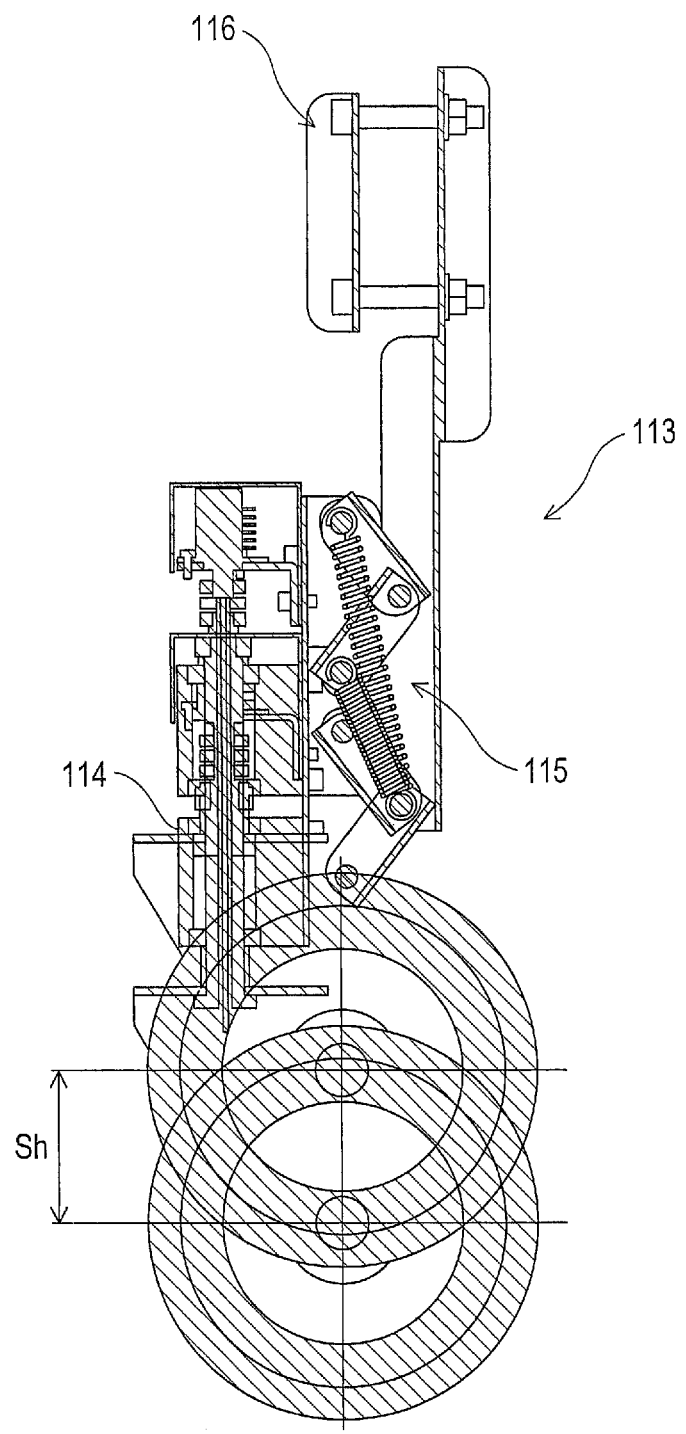
FIG. 22 is a cross-sectional view showing the mechanical operation of the free encoder.

As shown in FIG. 20, when the bucket 85 is in the open position, a connection position A2 between the first and second links 105 and 106 of the link mechanism 102 is deviated above a reference line Ls that connects the rotational center C of the first link 105 with a connection position A1 between the movable part 87 and the second link 106. Further, the collecting-discharging device 30 is provided with a stopper 107 that bumps against the first link 105 so as to be capable of preventing the upward rotation of the first link 105 when the bucket 85 is in the open position. Since the connection position A2 is deviated above the reference line Ls, the moment, which allows the movable part 87 to rotate downward by gravity, is transmitted to the first link 105 as the moment, which allows the first link 105 to rotate upward, when the bucket 85 is in the open position. The upward rotation of the first link 105, which is caused by this moment, is prevented by the stopper 107. Accordingly, since it is possible to cancel out the moment, which is generated at the movable part 87 when the bucket 85 is in the open position, by the stopper 107, the power of the electric motor 101 is not needed to keep the bucket in the open position. Therefore, since the power of the electric motor 101 may be stopped after the bucket 85 is moved to the open position from the closed position, it is possible to reduce the energy consumption of the electric motor 101.

An opening trim 108, which enhances the adhesiveness between the main body part 86 and the movable part 87 when the bucket 85 is in the closed position, is mounted on the movable part 87 of the bucket 85 as shown in FIGS. 16 and 19. The opening trim 108 as a seal member is made of flexible synthetic rubber. The opening trim 108 extends along an opening edge 87a of the movable part 87 from an upper end of one side portion of the opening edge 87a to an upper end of the other side portion of the opening edge via the bottom of the opening edge. Meanwhile, the opening trim 108 may be provided over the entire circumference of the opening edge 87a. Since the adhesiveness between the main body part 86 and the movable part 86 is enhanced by the opening trim 108 when the bucket is in the closed position, it is possible to prevent the leakage of clippings. Further, since the opening trim 108 is made of a flexible material, an effect of reducing noise and an effect of absorbing a shock at the time of the opening and closing of the bucket 85 are obtained together with an effect of preventing the leakage of clippings. Meanwhile, the opening trim 108 only needs to be interposed between the main body part 86 and the movable part 87. Accordingly, the opening trim 108 may be mounted on the main body part 86 of the bucket 85 or may be mounted on both the main body part 86 and the movable part 87.

As shown in FIG. 1, the lawn mowing vehicle 1 is provided with front-wheel encoders 111, rear-wheel encoders 112, and a free encoder 113, which is positioned between the front-wheel encoder 111 and the rear-wheel encoder 112, in order to detect its own traveling state. The front-wheel encoders 111 are provided on the left and right drum wheels 18L and 18R respectively, and the rear-wheel encoders 112 are provided on the left and right steered wheels 40L and 40R respectively. One free encoder 113 is provided in the middle of the lawn mowing vehicle in the vehicle width direction.

As described above, the drum wheels 18L and 18R are differentially rotated and generate drive torque respectively. It is possible to detect differential rotation or skidding of the respective wheels by using the front-wheel encoders 111. Accordingly, it is possible to improve the accuracy in control of the drive of the drum wheels 18L and 18R, and to obtain the timing when the pair of steered wheels 40L and 40R is driven. Since the pair of steered wheels 40L and 40R can be independently driven, the differential rotation or skidding occurs during the forward and backward movement or turning of the lawn mowing vehicle 1. It is possible to detect differential rotation or skidding of the respective wheels by using the rear-wheel encoders 112. Accordingly, it is possible to control the drive of the respective steered wheels 40L and 40R so that the lawn mowing vehicle 1 exactly corresponds to a predetermined trace.

Figure 17:
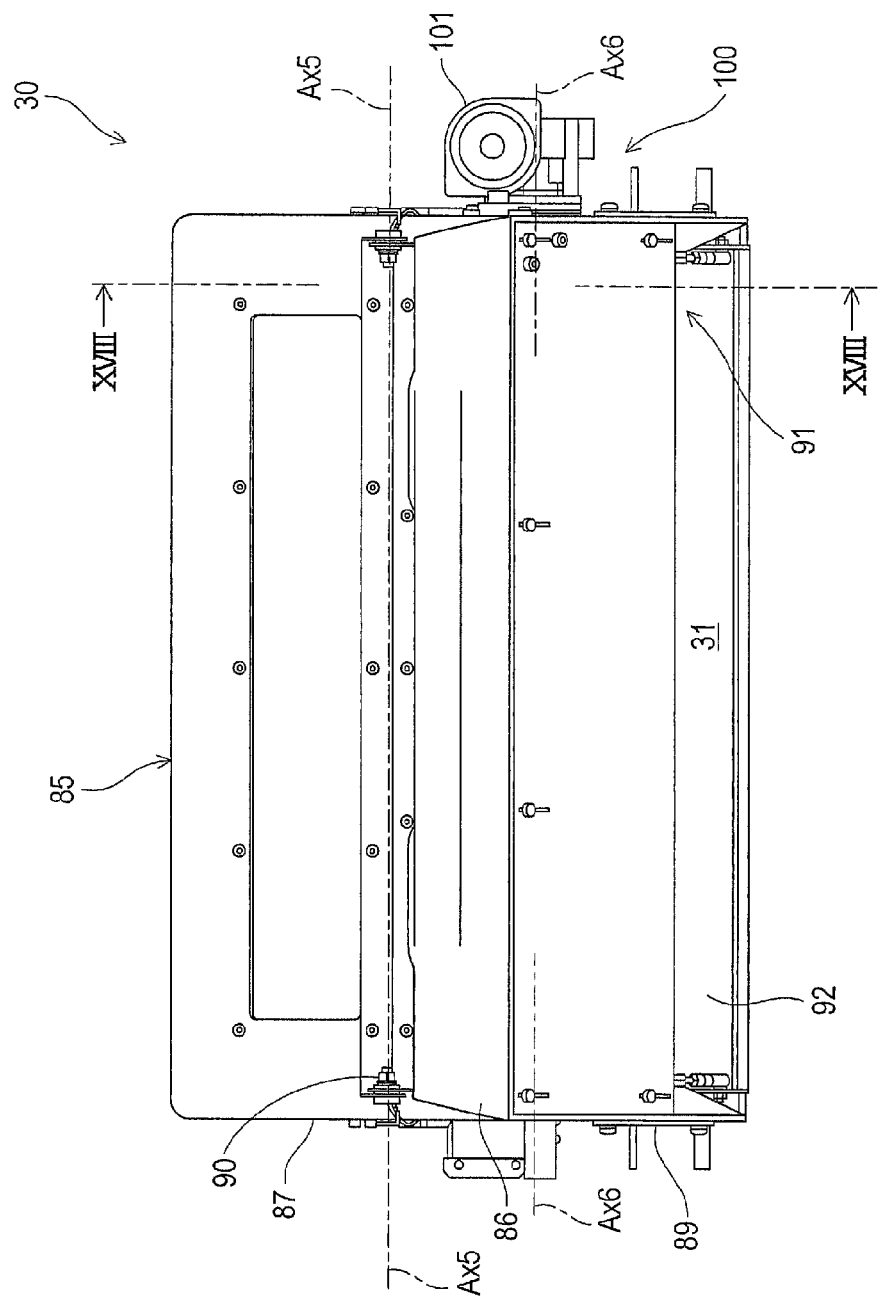
FIG. 17 is a view of the collecting device where the bucket is in a closed position, as seen from the upper side.

As shown in FIG. 1, the free encoder 113 has the structure of a caster that can freely rotate without drive power. For this reason, the free encoder can smoothly roll without restriction. As shown in FIGS. 16 and 17, the free encoder 113 includes a turning shaft 114 that extends in the vertical direction and is rotatable, and a suspension 115 that allows a stroke Sh (see FIG. 17) in the vertical direction. For this reason, it is possible to easily follow the change of the traveling direction of the lawn mowing vehicle 1 or the change of the road surface. Accordingly, it is possible to detect the exact traveling state of the lawn mowing vehicle 1. Optical sensors, which radiate inspection light to the road surface and detect position information on the basis of reflected light, have been generally known as sensors that detect the traveling state of a vehicle. However, since the lawn mowing vehicle 1 travels on the lawn surface, it is difficult to secure inspection accuracy due to the disturbance of the light reflected from the lawn surface even though these optical sensors are used. Accordingly, it is effective to apply the free encoder 113, of which the road surface following property is enhanced as described above, to the lawn mowing vehicle 1.

Figure 23:
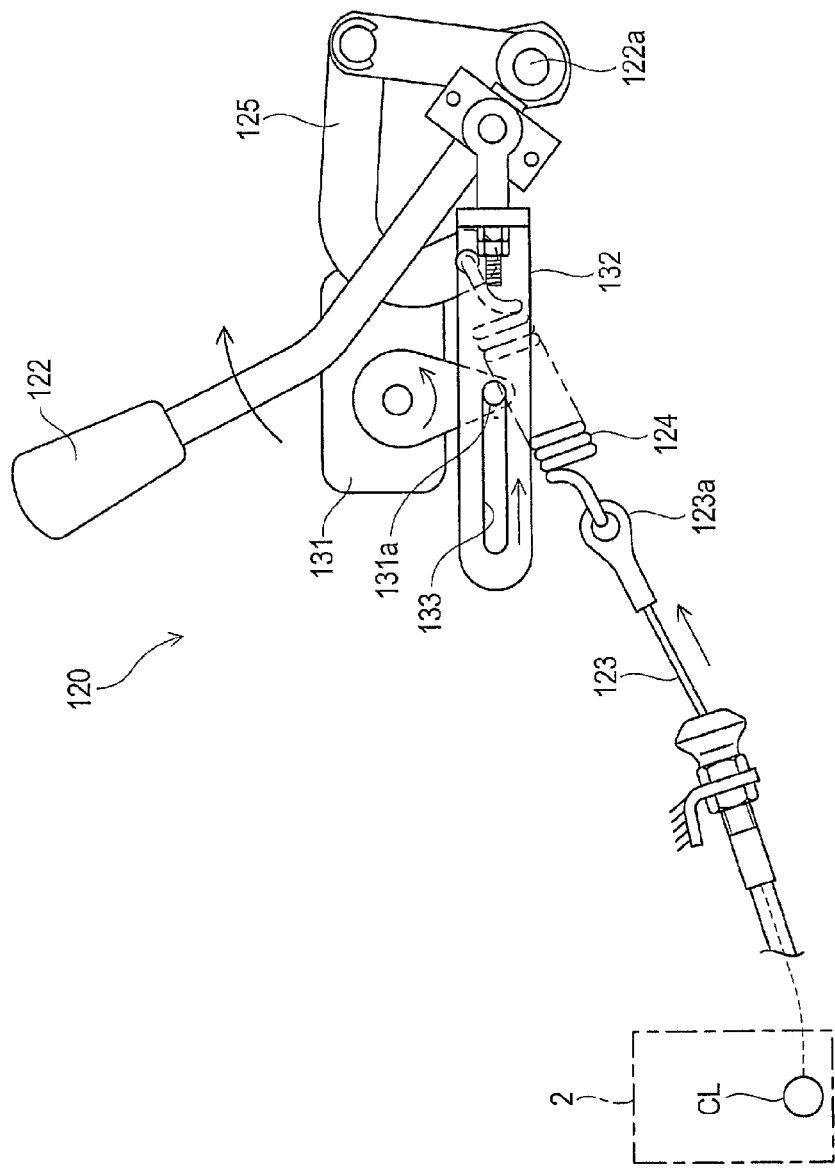
FIG. 23 is a view showing an operating mechanism that operates a cutting blade clutch of the lawn mowing unit.

The operating unit 13 shown in FIG. 1 includes operating mechanisms 120 and 140 that can be used to manually and automatically operate the lawn mowing unit 2. As shown FIG. 23, the operating mechanism 120 includes an operating lever 122 that is used to operate, for example, a cutting blade clutch CL of the lawn mowing unit 2. The operating lever 122 can be rotated about a rotating shaft 122a. The cutting blade clutch CL and the operating lever 122 are connected to each other by a wire 123. A coil spring 124, which suppresses the input of an excessive operating force, is provided at an end portion 123a of the wire 123. The coil spring 124 is connected to an intermediate mechanism 125 that transmits the operating force of the operating lever 122. Accordingly, when a user rotates the operating lever 122 in the direction of an arrow, the operating force of the operating lever 122 is transmitted to the wire 123 through the intermediate, mechanism 125, so that the wire 123 is pulled. Therefore, it is possible to manually operate the cutting blade clutch CL.

The operating mechanism 120 includes a rotary actuator 131 as a drive mechanism and an interposed member 132 that is interposed between the operating lever 122 and the rotary actuator 131, in order to automatically operate the cutting blade clutch CL. One end of the interposed member 132 is linked to the operating lever 122, and the other end of the interposed member is connected to a pin 131a of the rotary actuator 131 through a long hole 133. The pin 131a is connected so as to be relatively rotatable while sliding in a long hole of the interposed member 132. When the rotary actuator 131 is rotated in the direction of an arrow, the interposed member 132 is moved in the direction of an arrow. Accordingly, the operating lever 122 can be rotated in the direction of an arrow. For this reason, it is possible to automatically operate the cutting blade clutch CL by controlling the rotary actuator 131. The pin 131a of the rotary actuator 131 and the interposed member 132 can be moved relative to each other while using both end portions of the long hole 133 as the limit of the movement thereof. Accordingly, when the operating lever 122 is manually moved, the interposed member 132 is moved relative to the pin 131a. Therefore, an operating force, which is caused by the manual operation of the operating lever 122, is not input to the rotary actuator 131. For this reason, it is possible to manually and automatically operate the cutting blade clutch CL by the operating mechanism 120.

Figure 24:
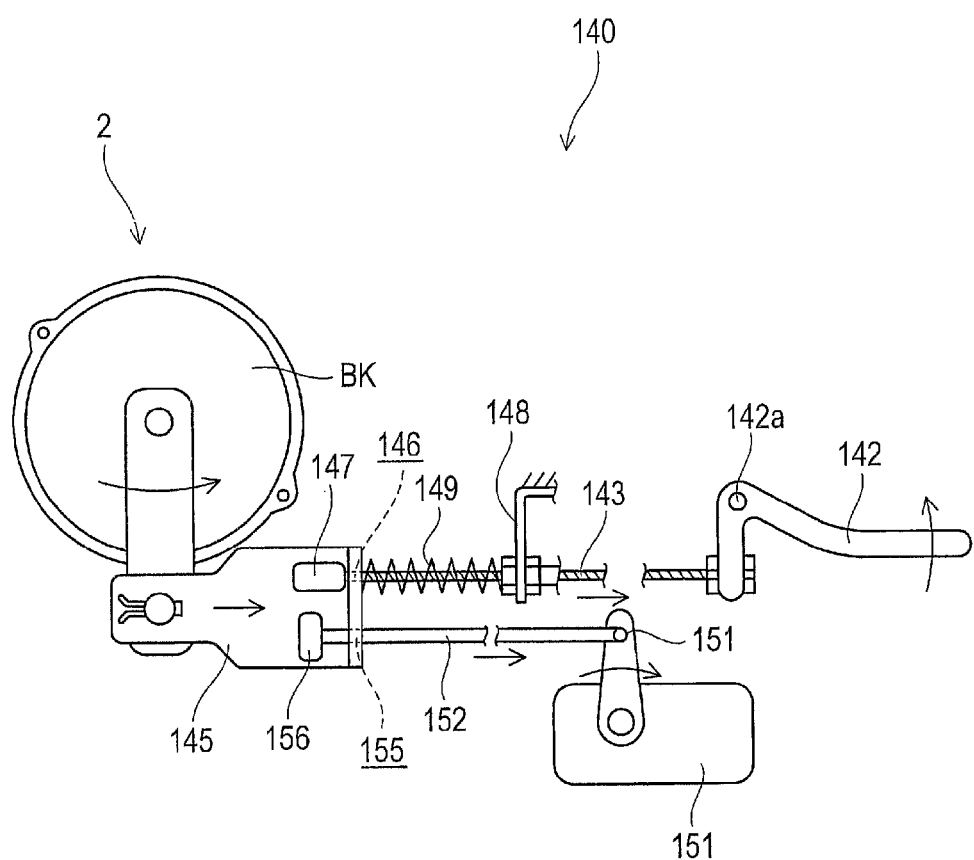
FIG. 24 is a view showing the operating mechanism that operates a brake of the lawn mowing unit.

As shown in FIG. 24, the operating mechanism 140 includes an operating lever 142 that is used to operate, for example, a brake BK of the lawn mowing unit 2. The operating lever 142 can be rotated about a rotating shaft 142a. A wire 143 is interposed between the brake BK and the operating lever 122. One end of the wire 143 is connected to the operating lever 142, and the other end of the wire 143 is connected to the brake BK by an intermediate member 145. A mounting hole 146, which has an inner diameter slightly larger than the diameter of the wire 143, is formed at the intermediate member 145. The wire 143 is inserted into the mounting hole 146, and a retaining member 147, which is sufficiently larger than the inner diameter of the mounting hole 146, is fixed to the end portion of the wire 143. Accordingly, when the operating lever 142 is operated in the direction of an arrow, the wire 143 is pulled in the direction of an arrow. Since the retaining member 147 is fixed to the end portion of the wire 143, the retaining member 147 bumps against the intermediate member 145. For this reason, the intermediate member 145 is pulled in the direction of an arrow, so that the brake BK is operated in the direction of an arrow. Accordingly, it is possible to manually operate the brake BK. The wire 143 is supported by the bracket 148, and a return spring 149 is provided between the bracket 148 and the intermediate member 145. For this reason, when the operating lever 142 is separated from an operating position, the operating lever 142 returns to an original position by an elastic force of the return spring 149.

The operating mechanism 140 includes a rotary actuator 151 as a drive mechanism and a rod 152 that is linked to a pin 151*a* of the rotary actuator 151, in order to automatically operate the brake BK. A mounting hole 155, which has an inner diameter slightly larger than the diameter of the rod 152, is formed at the intermediate member 145. The rod 152 is inserted into the mounting hole 155, and a retaining member 156, which is sufficiently larger than the inner diameter of the mounting hole 155, is fixed to the end portion of the rod 152. When the rotary actuator 151 is rotated in the direction of an arrow, the rod 152 is pulled in the direction of an arrow. Since the retaining member 156 is fixed to the end portion of the rod 152, the retaining member 156 bumps against the intermediate member 145. For this reason, the intermediate member 145 is pulled in the direction of an arrow, so that the brake BK is operated in the direction of an arrow. Accordingly, it is possible to automatically operate the brake BK by controlling the rotary actuator 151. As long as the intermediate member 145 does not bump against the retaining member 156 fixed to the end portion of the rod 152, the intermediate member 145 can be freely moved while the rod 152 is inserted into the intermediate member. For this reason, an operating force, which is caused by the manual operation of the operating lever 142, is not input to the rotary actuator 151. Further, even when the automatic operation of the brake is performed by the rotary actuator 151, likewise, the intermediate member 145 can be freely moved while the wire 143 is inserted into the intermediate member. Accordingly, the wire 143 and the operating lever 142 are not moved. For this reason, it is possible to manually and automatically operate the brake BK by the operating mechanism 140.

The invention is not limited to the above-mentioned embodiment, and may be embodied in various forms. The collecting-discharging device according to the embodiment of the invention may apply to a lawn mowing vehicle on which a worker can get, a hand push mower, and the like, as well as a radio control or self-traveling lawn mowing vehicle.

CITATION LIST

Patent Literature

Patent Literature: JP-A-2010-57446

The invention claimed is:

1. A clippings collecting-discharging device applied to a mower that collects and discharges grass clippings, the clippings collecting-discharging device comprising:
a bucket that is mounted on the mower, is divided into a main body part including an inlet through which clippings flow and a movable part rotatably connected to an upper end portion of the main body part, and is operated between a closed position where the main body part and the movable part abut on each other and an open position where the movable part is rotated upward and thus is separated from the main body part;
a discharge plate that is provided in the bucket and is positioned near the inlet in a lying posture with a surface facing upward when the bucket is in the closed position; and
a discharge mechanism that operates the discharge plate so that the discharge plate stands up toward an opening between the main body part and the movable part while interlocking with the operation of the bucket when its position is changed to the open position from the closed position, wherein
the opening is formed away from the inlet by rotating the movable part upward, and
the discharge mechanism is adapted so that a lower portion of the surface of the discharge plate is exposed and faces away from the main body part when the bucket is in the open position and the discharge plate stands up.

2. The clippings collecting-discharging device according to claim 1,
wherein the discharge mechanism includes a connecting device that connects the discharge plate to the main body part so as to allow the discharge plate to rotate, and a link of which one end is connected to the discharge plate and the other end is connected to the movable part.

3. The clippings collecting-discharging device according to claim 1, further comprising:
a drive source;
a link mechanism that transmits power of the drive source to the movable part; and
a drive mechanism that operates the bucket between the closed position and the open position.

4. The clippings collecting-discharging device according to claim 3,
wherein the link mechanism includes a first link of which a rotational center is set on the main body part and a second link having one end connected to the first link and the other end connected to the movable part,
wherein the link mechanism is configured in a manner that a connection position between the first and second links is deviated up from a reference line, which connects the rotational center of the first link to a connection position between the movable part and the second link, when the bucket is in the open position, and
wherein a stopper is provided so as to bump against the first link to thereby be capable of preventing the first link from rotating upward when the bucket is in the open position.

5. The clippings collecting-discharging device according to claim 1, further comprising:
a seal member that is made of a flexible material and is interposed between the main body part and the movable part when the bucket is in the closed position.

6. The clippings collecting-discharging device according to claim 1,
wherein the discharge mechanism includes a connecting device that connects the discharge plate to the main body part so as to allow the discharge plate to rotate, and a link of which one end is connected to the discharge plate and the other end is connected to the movable part.

7. The clippings collecting-discharging device according to claim 1, further comprising:
a seal member that is made of a flexible material and is interposed between the main body part and the movable part when the bucket is in the closed position.

8. The clippings collecting-discharging device according to claim 2, further comprising:

a seal member that is made of a flexible material and is interposed between the main body part and the movable part when the bucket is in the closed position.

9. The clippings collecting-discharging device according to claim 3, further comprising:
a seal member that is made of a flexible material and is interposed between the main body part and the movable part when the bucket is in the closed position.

10. The clippings collecting-discharging device according to claim 4, further comprising:
a seal member that is made of a flexible material and is interposed between the main body part and the movable part when the bucket is in the closed position.

\* \* \* \* \*